US012754285B2

(12) United States Patent
Bansal et al.

(10) Patent No.: US 12,754,285 B2
(45) Date of Patent: Oct. 6, 2026

(54) MULTI RADAR OBJECT DETECTION

(71) Applicant: The Regents of the University of California, Oakland, CA (US)

(72) Inventors: Kshitiz Bansal, San Diego, CA (US); Dinesh Bharadia, San Diego, CA (US)

(73) Assignee: The Regents at the University of California, Oakland, CA (US)

( * ) Notice: Subject to any disclaimer, the term of this patent is extended or adjusted under 35 U.S.C. 154(b) by 510 days.

(21) Appl. No.: 18/252,346

(22) PCT Filed: Nov. 12, 2021

(86) PCT No.: PCT/US2021/059190
§ 371 (c)(1),
(2) Date: May 9, 2023

(87) PCT Pub. No.: WO2022/104096
PCT Pub. Date: May 19, 2022

(65) Prior Publication Data

US 2024/0004031 A1 Jan. 4, 2024

Related U.S. Application Data

(60) Provisional application No. 63/113,123, filed on Nov. 12, 2020.

(51) Int. Cl.
*G01S 7/41* (2006.01)
*G01S 13/87* (2006.01)
(Continued)

(52) U.S. Cl.
CPC ............... *G01S 7/411* (2013.01); *G01S 13/87* (2013.01); *G01S 13/89* (2013.01); *G01S 13/931* (2013.01)

(58) Field of Classification Search
CPC .......... G01S 7/411; G01S 13/87; G01S 13/89; G01S 13/931
See application file for complete search history.

(56) References Cited

U.S. PATENT DOCUMENTS 9,221,396 B1 * 12/2015 Zhu ........................ B60Q 9/008
10,678,246 B1 * 6/2020 Warshauer-Baker ........................ G05D 1/247
(Continued)

FOREIGN PATENT DOCUMENTS

WO WO-2020113160 A2 6/2020

OTHER PUBLICATIONS

"FMCW Fundamentals in TI Radar." (Available at https://training.ti.com/mmwave-training-series.).
(Continued)

*Primary Examiner* — Marcus E Windrich
(74) *Attorney, Agent, or Firm* — FisherBroyles, LLP

(57) ABSTRACT

A method, a system, and a computer program product for detecting one or more objects. One or more signals reflected by one or more second objects is received, where the signals are received by one or more radar sensors positioned on one or more first objects. Based on the one or more received signals, one or more representations are generated. One or more portions of the generated representations correspond to the one or more received signals. One or more virtual enclosures encompassing the one or more second objects are generated using the one or more representations. A presence of the one or more second objects is detected using the generated one or more virtual enclosures.

16 Claims, 17 Drawing Sheets

(51) Int. Cl.
*G01S 13/89* (2006.01)
*G01S 13/931* (2020.01)

(56) References Cited

U.S. PATENT DOCUMENTS

| | | | | |
|---|---|---|---|---|
| 11,373,523 | B2 * | 6/2022 | Qi | G08G 1/065 |
| 11,719,799 | B2 * | 8/2023 | Lilja | G06V 20/588<br>342/27 |
| 2018/0284258 | A1 * | 10/2018 | Roger | G01S 13/003 |
| 2018/0314921 | A1 * | 11/2018 | Mercep | G05D 1/0088 |
| 2019/0180502 | A1 * | 6/2019 | Englard | G01S 7/40 |
| 2019/0212746 | A1 * | 7/2019 | Cheng | G01V 9/005 |
| 2020/0103523 | A1 * | 4/2020 | Liu | G01S 13/87 |
| 2020/0309899 | A1 * | 10/2020 | Jonas | G01S 13/931 |
| 2020/0410704 | A1 * | 12/2020 | Choe | G01S 7/497 |
| 2021/0118291 | A1 * | 4/2021 | Qi | G08G 1/052 |
| 2021/0156963 | A1 * | 5/2021 | Popov | G06N 3/0464 |

OTHER PUBLICATIONS

"Intel RealSense D415 depth camera." (Available at https://www.intelrealsense.com/).
"LiDAR vs Radar for Applied Autonomy." (Available at https://semcon.com/what-we-do/applied-autonomy/LiDAR-vs-radar-for-applied-autonomy/).
"Modeling Indoor Propagation." (Available at http://www.remcom.com/examples/modeling-indoor-propagation).
"Report of traffic collision involving an autonomous vehicle (OL316)." (Available at https://www.dmv.ca.gov/portal/uploads/2021/05/OL316.pdf).
"OS-1, Ouster 16 channel LiDAR." (Available at https://ouster.com/products/os1-LiDAR-sensor/).
"Scalabel—Beldey Deepdrive." (Available at https://www.scalabel.ai/).
"Waymo Open Dataset: An autonomous driving dataset." (Available at http://web.archive.org/web/20190825204209/https://github.com/waymo-research/waymo-open-dataset) 2019.
Adib, F. et al. "Multi-person Localization via RF Body Reflections." In 12th {USENIX} Symposium on Networked Systems Design and Implementation ({NSDI} 15), pp. 279-292, 2015.
Adib, F. et al. Smart Homes that Monitor Breathing and Heart Rate. In Proceedings of the 33rd annual ACM Conference on Human Factors in Computing Systems. ACM, 2015.
Almalioglu, Y. et al. "Milli-RIO: Ego-Motion Estimation with Low-Cost Millimetre-Wave Radar." IEEE Sensors Journal, 2020.
Belfiori, F. et al. "2D-MUSIC Technique Applied to a Coherent FMCW MIMO Radar," 2012. IET International Conference on Radar Systems (Radar 2012). IET, 2012.
Berboucha, M. "Uber self-driving car crash: What really happened." (Available at https://www.forbes.com/sites/meriameberboucha/2018/05/28/uber-self-driving-car-crash-what-really-happened/#11619a944dc4). May 28, 2018.
Bühren, M. et al. "Automotive Radar Target List Simulation based on Reflection Center Representation of Objects." In Proc. Intern. Workshop on Intelligent Transportation (WIT), pp. 161-166, 2006.
Burke, K. "Perception Matters: How Deep Learning Enables Autonomous Vehicles to Understand Their Environment." (Available at https://blogs. nvidia.com/blog/2018/08/1 0/autonomous-vehicles-perception-layer/).
Caesar, H. et al. "nuScenes: A multimodal dataset for autonomous driving," arXiv preprint arXiv:1903.11027, 2019.
Chen, X. et al. "Monocular 3D Object Detection for Autonomous Driving." 2016 IEEE Conference on Computer Vision and Pattern Recognition (CVPR), pp. 2147-2156, 2016.
Chen, X. et al. "Multi-View 3D Object Detection Network for Autonomous Driving." 2017 IEEE Conference on Computer Vision and Pattern Recognition (CVPR), Jul. 2017.
Dai, J. et al. "R-FCN: Object Detection via Region-Based Fully Convolutional Networks." Advances in Neural Information Processing Systems 29 (2016).
Daniel, L. et al. "Low-THz Radar, LiDAR and Optical Imaging through Artificially Generated Fog." 2017.
Danzer, A. et al. "2D Car Detection in Radar Data with PointNets." arXiv preprint arXiv:1904.08414 (2019).
Darms, M. et al. "Classification and Tracking of Dynamic Objects with Multiple Sensors for Autonomous Driving in Urban Environments." In 2008 IEEE Intelligent Vehicles Symposium, pp. 1197-1202. IEEE, 2008.
Du, X. et al. "A General Pipeline for 3D Detection of Vehicles." arXiv preprint arXiv:1803.00387 (2018).
Ester, M. et al. "A Density-Based Algorithm for Discovering Clusters in Large Spatial Databases with Noise." In KDD, vol. 96, pp. 226-231, 1996.
Favalli, L. et al. "Multi-Radar Data Fusion for Object Tracking and Shape Estimation." Signal Processing, 48(3):235-239, 1996.
Fembacher, F. et al. "Real-Time Synthetic Aperture Radar for Automotive Embedded Systems." In 2018 15th European Radar Conference (EuRAD), pp. 517-520. IEEE, 2018.
Geiger, A. et al. "Are we ready for Autonomous Driving? The KITTI Vision Benchmark Suite." 2012 IEEE In Conference on Computer Vision and Pattern Recognition (CVPR), 2012.
Girshick, R. "Fast R-CNN," 2015 IEEE International Conference on Computer Vision (ICCV), Dec. 2015.
Girshick, R. et al. "Rich Feature Hierarchies for Accurate Object Detection and Semantic Segmentation." 2014 IEEE Conference on Computer Vision and Pattern Recognition, Jun. 2014.
Gisder, T. et al. "Synthetic Aperture Radar Towards Automotive Applications." In 2019 20th International Radar Symposium (IRS), pp. 1-10. IEEE, 2019.
Gishkori, S. et al. "Imaging Moving Targets for a Forward-Scanning Automotive Sar." IEEE Transactions on Aerospace and Electronic Systems, 56(2):1106-1119, 2019.
Guan, J. et al. "High Resolution Millimeter Wave Imaging for Self-Driving Cars." arXiv preprint arXiv:1912.09579 (2019).
Hammarstrand, L. et al. "Extended Object Tracking Using a Radar Resolution Model." IEEE Transactions on Aerospace and Electronic Systems, 48(3):2371-2386, 2012.
He, K. et al. "Mask R-CNN," 2017 IEEE International Conference on Computer Vision (ICCV), Oct. 2017.
Hsu, C.-Y. et al. "Enabling Identification and Behavioral Sensing in Homes using Radio Reflections." In Proceedings of the 2019 CHI Conference on Human Factors in Computing Systems, Paper 548. ACM, 2019.
Hsu, C.-Y. et al. "Extracting Gait Velocity and Stride Length from Surrounding Radio Signals." In Proceedings of the 2017 CHI Conference on Human Factors in Computing Systems, pp. 2116-2126. ACM, 2017.
Hsu, C.-Y. et al. Zero-Effort In-Home Sleep and Insomnia Monitoring Using Radio Signals. Proceedings of the ACM on Interactive, Mobile, Wearable and Ubiquitous Technologies, 1(3):59, 2017.
Jouny, I. "Target Identification Using Multi-Radar Fusion." In Automatic Target Recognition XVII, vol. 6566, p. 65660M. International Society for Optics and Photonics, 2007.
Kellner, D. et al. "Instantaneous Lateral Velocity Estimation of a Vehicle Using Doppler Radar," In Proceedings of the 16th International Conference on Information Fusion, IEEE, 2013.
Kotaru, M. et al. "Light-Field for RF." arXiv preprint arXiv:1901.03953 (2019).
Kutila, M. et al. "Automotive LiDAR Performance Verification in Fog and Rain." In 2018 21st International Conference on Intelligent Transportation Systems (ITSC), pp. 1695-1701. IEEE, 2018.
Li, B. et al. "Vehicle Detection from 3D LiDAR Using Fully Convolutional Network," Robotics: Science and Systems XII.
Li, Y. et al. "FPNN: Field Probing Neural Networks for 3D Data." Advances in Neural Information Processing Systems 29 (2016).
Lombacher, J. et al. "Potential of Radar for Static Object Classification Using Deep Learning Methods." In 2016 IEEE MTT-S International Conference on Microwaves for Intelligent Mobility (ICMIM), pp. 1-4, IEEE, 2016.
Lombacher, J. et al. "Semantic Radar Grids," 2017 IEEE Intelligent Vehicles Symposium (IV), pp. 1170-1175, 2017.

(56) References Cited

OTHER PUBLICATIONS

Long, J. et al. "Fully Convolutional Networks for Semantic Segmentation," IEEE Transactions on Pattern Analysis and Machine Intelligence, 2015.
Lu, C. X. et al. See Through Smoke: Robust Indoor Mapping with Low-Cost mmWave Radar. In MobiSys, pp. 14-27, 2020.
Major, B. et al. Vehicle Detection with Automotive Radar Using Deep Learning on Range-Azimuth-Doppler Tensors. In Proceedings of the IEEE/CVF International Conference on Computer Vision Workshops. 2019.
Maturana, D. et al. VoxNet: A 3D Convolutional Neural Network for Real-Time Object Recognition. 2015 IEEE/RSJ international conference on intelligent robots and systems (IROS). IEEE, 2015.
Mededovie, P. et al. "Wireless Insite Software Verification via Analysis and Comparison of Simulation and Measurement Results." In 2012 Proceedings of the 35th International Convention MIPRO, pp. 776-781. IEEE, 2012.
Metzner, A. et al. "On Multi-Sensor Radar Configurations for Vehicle Tracking in Autonomous Driving Environments." In 2018 21st International Conference on Information Fusion (FUSION), pp. 1-8. IEEE, 2018.
Meyer, M. et al. "Automotive Radar Dataset for Deep Learning Based 3D Object Detection." In 2019 16th European Radar Conference (EuRAD), pp. 129-132. IEEE, 2019.
Meyer, M. et al. "Deep Learning Based 3D Object Detection for Automotive Radar and Camera." In 2019 16th European Radar Conference (EuRAD), pp. 133-136. IEEE, 2019.
Mousavian, A. et al. "3D Bounding Box Estimation Using Deep Learning and Geometry," 2017 Proceedings of the IEEE Conference on Computer Vision and Pattern Recognition (CVPR) 2017.
Neal, A. "LiDAR vs. Radar." (Available at https://www.sensorsmag.com/components/LiDAR-vs-radar).
Pedregosa, F. et al. "Scikit-learn: Machine Learning in Python." Journal of Machine Learning Research, 12:2825-2830, 2011.
Pendleton, S. D. et al. "Perception, Planning, Control, and Coordination for Autonomous Vehicles." Machines, 5(1):6, 2017.
Petsios, M. N. et al. "Solving the Association Problem for a Multistatic Range-Only Radar Target Tracker." Signal Processing, 88(9):2254-2277, 2008.
Pohlmann, T. "Patent and SEP trends in automonous driving technologies." (Available at https://www.iam-media.com/patent-and-sep-trends-autonomous-driving-technologies).
Qi, C. R. et al. Frustum PointNets for 3D Object Detection from RGB-D Data. Proceedings of the IEEE conference on computer vision and pattern recognition, pp. 918-927. 2018.
Qi, C. R. et al. "PointNet++: Deep Hierarchical Feature Learning on Point Sets in a Metric Space." Advances in Neural Information Processing Systems 30 (2017).
Qi, C. R. et al. "PointNet: Deep Learning on Point Sets for 3D Classification and Segmentation." 2017 IEEE Conference on Computer Vision and Pattern Recognition (CVPR), Jul. 2017.
Qi, C. R. et al. "Volumetric and Multi-View CNNs for Object Classification on 3D Data." 2016 IEEE Conference on Computer Vision and Pattern Recognition (CVPR), Jun. 2016.
Redmon, J. et al. "YOLO9000: Better, Faster, Stronger." Proceedings of the IEEE Conference on Computer Vision and Pattern Recognition (CVPR), Jul. 2017.
Ren, S. et al. "Faster R-CNN: Towards Real-Time Object Detection with Region Proposal Networks," IEEE Transactions on Pattern Analysis and Machine Intelligence, vol. 39, p. 1137-1149, Jun. 2017.
Riegler, G. et al. "OctNet: Learning Deep 3D Representations at High Resolutions," 2017 IEEE Conference on Computer Vision and Pattern Recognition (CVPR), Jul. 2017.
Roehr, S. et al. "Precise Distance and Velocity Measurement for Real Time Locating in Multipath Environments Using a Frequency-Modulated Continuous-Wave Secondary Radar Approach," IEEE Transactions on Microwave Theory and Techniques, vol. 56, No. 10, pp. 2329-2339, 2008.
Scheel, A. et al. "Multi-Sensor Multi-Object Tracking of Vehicles Using High-Resolution Radars." In 2016 IEEE Intelligent Vehicles Symposium (IV), pp. 558-565. IEEE, 2016.
Schuler, K. et al. Extraction of Virtual Scattering Centers of Vehicles by Ray-Tracing Simulations. IEEE Transactions on Antennas and Propagation, 56(11):3543-3551, 2008.
Schumann, O. et al. "Semantic Segmentation on Radar Point Clouds." 2018 21st International Conference on Information Fusion (FUSION), pp. 2179-2186, 2018.
Shi, S. et al. "PointRCNN: 3D Object Proposal Generation and Detection from Point Cloud." 2018.
Shi, S. et al. "PV-RCNN: Point-Voxel Feature Set Abstraction for 3D Object Detection." arXiv preprint arXiv:1912.13192, 2019.
Song, M. et al. "The Velocity and Range Detection Using the 2D-FFT Scheme for Automotive Radars," 2014 4th IEEE International Conference on Network Infrastructure and Digital Content, pp. 507-510, 2014.
Stock, K. "Self-driving cars can handle neither rain nor sleet nor snow." (Available at https://www.bloomberg.com/news/articles/2018-09-17/self-driving-cars-still-can-t-handle-bad-weather).
Tian, Y. et al. "RF-Based Fall Monitoring Using Convolutional Neural Networks." 2018.
Van Brummelen, J. et al. Autonomous Vehicle Perception: The Technology of Today and Tomorrow. Transportation Research Part C: Emerging Technologies, 89:384-406, 2018.
Visentin, T. et al. "Classification of Objects in Polarimetric Radar Images Using CNNs at 77 GHz," 2017 IEEE Asia Pacific Microwave Conference (APMC), pp. 356-359, 2017.
Wang, Y. et al. "PointSeg: Real-Time Semantic Segmentation Based on 3D LiDAR Point Cloud." arXiv preprint arXiv:1807.06288 (2018).
Wang, Z. "Frustum ConvNet: Sliding Frustums to Aggregate Local Point-Wise Features for Amodal 3D Object Detection." arXiv preprint arXiv:1903.01864 (2019).
Wold, S. et al. "Principal Component Analysis." Chemometrics and Intelligent Laboratory Systems, 2(1-3):37-52, 1987.
Wu, B. et al. "SqueezeSeg: Convolutional Neural Nets with Recurrent CRF for Real-Time Road-Object Segmentation from 3D LiDAR Point Cloud." arXiv preprint arXiv:1710.07368 (2017).
Wu, B. et al. "SqueezeSegV2: Improved Model Structure and Unsupervised Domain Adaptation for Road-Object Segmentation from a LIDAR Point Cloud." arXiv e-prints (2018): arXiv-1809.08495.
Xu, J. et al. "Multi-Radar Data Fusion Imaging Based on Iterative Adaptive Algorithm." In 2017 International Applied Computational Electromagnetics Society Symposium (ACES), pp. 1-2. IEEE, 2017.
Yue, S. et al. "Extracting Multi-Person Respiration from Entangled RF Signals." 2018.
Zhang, X. et al. "Efficient L-Shape Fitting for Vehicle Detection Using Laser Scanners." 2017.
Zhao, M. et al. "Emotion Recognition Using Wireless Signals." In Proceedings of the 22nd Annual International Conference on Mobile Computing and Networking, pp. 95-108. ACM, 2016.
Zhao, M. et al. "Learning Sleep Stages From Radio Signals: A Conditional Adversarial Architecture." In Proceedings of the 34th International Conference on Machine Learning—vol. 70, pp. 4100-4109. JMLR.org, 2017.
Zhao, M. et al. "RF-Based 3D Skeletons." In Proceedings of the 2018 Conference of the ACM Special Interest Group on Data Communication, pp. 267-281. ACM, 2018.
Zhao, M. et al. "Through-Wall Human Pose Estimation Using Radio Signals." In Proceedings of the IEEE Conference on Computer Vision and Pattern Recognition, pp. 7356-7365, 2018.

* cited by examiner

810

820

MULTI RADAR OBJECT DETECTION

CROSS-REFERENCE TO RELATED APPLICATIONS

This application is a national stage entry of Patent Cooperation Treat Application No. PCT/US2021/059190 filed Nov. 12, 2021, entitled "MULTI RADAR OBJECT DETECTION," which claims priority to U.S. Provisional Patent Appl. No. 63/113,123 filed Nov. 12, 2020, entitled "MIMO SYNCHRONIZED LARGE APERTURE RADAR," the disclosures of which are incorporated herein by reference in their entirety.

TECHNICAL FIELD

The subject matter disclosed herein relates to data processing, and in particular to identifying one or more objects in an environment of another object (e.g., a vehicle), and more particularly, to generating accurate bounding box estimation in multi-radar systems of vehicles for identification of objects.

BACKGROUND

Autonomous vehicles are becoming a more frequent occurrence on the road. Such vehicles are typically equipped with a variety of sensors, cameras, and other devices that allow the vehicle to determine its position, location, heading direction, and detect various objects around it. Typically, autonomous vehicles include LiDAR sensors which are light based sensors that measure reflection of a light signal to determine a geometry of a scene. However, such sensors as well as cameras are unable to provide proper sensing in bad weather or other adverse conditions. This may result in undesired consequences, including fatal accidents. Thus, it is important to equip autonomous vehicles with an ability to "see" the environment in all weather or other undesired conditions.

SUMMARY

In some implementations, the current subject matter relates to a computer-implemented method for detecting presence of an object. The method may include receiving one or more signals reflected by one or more second objects, the signals being received by one or more radar sensors positioned on one or more first objects; generating, based on the one or more received signals, one or more representations, one or more portions of the generated representations corresponding to the one or more received signals; generating, using the one or more representations, one or more virtual enclosures encompassing the one or more second objects; and detecting, using the generated one or more virtual enclosures, a presence of the one or more second objects.

In some implementations, the current subject matter may include one or more of the following optional features. The radar sensors may be positioned on the vehicle a predetermined distance apart. The radar sensors may include two radar sensors.

In some implementations, the radar sensors may include a plurality of radar sensors. At least one radar sensor in the plurality of radar sensors may be configured to receive a signal transmitted by at least another radar sensor in the plurality of radar sensors. Further, at least a portion of the plurality of radar sensors may be time-synchronized.

In some implementations, one or more generated representations may include one or more point clouds. One or more portions of the generated representations may include one or more points in the point clouds. In some implementations, the method may also include filtering the generated point clouds to remove one or more points corresponding to one or more noise signals in the received signals, and generating, using the filtered point clouds, one or more virtual enclosures encompassing the second objects.

In some implementations, the generating of the point clouds may include generating one or more cross potential point clouds by combining one or more point clouds generated using signals received by each radar sensor. Generation of one or more cross potential point clouds may include clustering at least a portion of the point clouds using a number of points corresponding to at least a portion of the received signals being received from the one or more scattering region of a second object, generating one or more clustered point clouds, combining at least a portion of the clustered point clouds based on a determination that at least a portion of the clustered point clouds is associated with the second object and determined based on signals received from different radar sensors, and generating the cross potential point clouds.

In some implementations, the filtering may include removing one or more noise signals in the received signals received by each radar sensor. The filtering may include removing one or more noise signals in the received signals using one or more predetermined signal to noise ratio thresholds.

In some implementations, the generation of one or more object enclosures may include generating one or more anchor enclosures (e.g., anchor boxes) corresponding to each point in the point clouds. Generation of one or more anchor enclosures may include extracting, using the anchor enclosures, a plurality of features corresponding to the second objects, and determining, based on the extracting, a single feature representative of each anchor enclosure. Generation of one or more object enclosures may include predicting one or more object enclosures using the determined single feature of each anchor enclosure, associating a confidence value with each predicted object enclosure in the predicted object enclosures, and refining, based on the associated confidence value, one or more parameters of each predicted object enclosure to generate one or more virtual enclosures.

In some implementations, the object enclosure may include at least one of the following: a three-dimensional object enclosure, a two-dimensional object enclosure, and any combination thereof. The one or more virtual enclosures may include at least one of the following parameters: a length, a breadth, a height, one or more center coordinates, an orientation angle, and any combination thereof.

In some implementations, at least one of the first and second objects may include at least one of the following: a vehicle, an animate object, an inanimate object, a moving object, a motionless object, a human, a building, and any combination thereof.

In some implementations, the presence of an object may include at least one of the following: a location, an orientation, a direction, a position, a type, a size, an existence, and any combination thereof of the one or more second objects.

In some implementations, one or more second objects may be located in an environment of the one or more first objects. The presence of one or more second objects may be determined in the environment of the one or more first objects.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to identification of objects within an environment, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
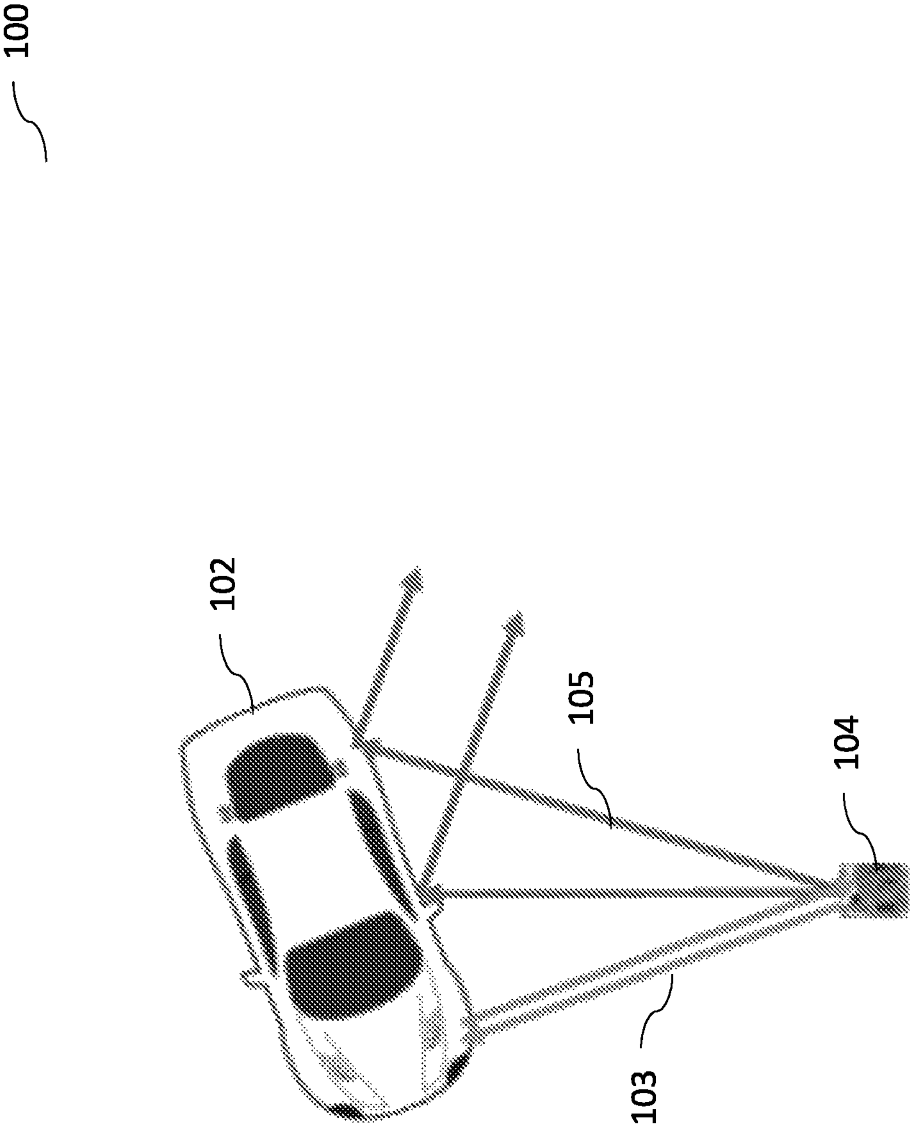
FIG. 1 illustrates a conventional radar system.

One or more implementations of the current subject matter relate to methods, systems, articles of manufacture, and the like that may, among other possible advantages, provide an ability to identify one or more objects in an environment of another object (e.g., a vehicle), and in particular, to generate accurate bounding box estimation in multi-radar systems of vehicles for identification of objects. While the following description will refer to identification of objects in an environment of a vehicle, it should be understood that the current subject matter is not limited to that and is applicable to any type of object that may be configured to perform determination/identification of other objects within its environment. The term(s) vehicle(s) is used for ease of discussion and illustration purposes only, but is not intended to limit the scope of the current subject matter and the claims.

Autonomous perception (such as in automotive systems) requires high-quality environment sensing in the form of 3D bounding boxes of dynamic objects. Primary sensors used in such automotive systems are typically light-based cameras and LiDARs. However, these sensors are known to fail in adverse weather conditions. Radars can potentially solve this problem as they are typically not affected by such adverse weather conditions. However, the wireless signals used in radars undergo predominantly specular reflections, that can cause poor performance of radar point clouds because of the lack of resolution.

In some implementations, the current subject matter relates to a system (including any associated methods, articles of manufacture, etc.) that may be configured to combine data from one or more spatially separated radars with an optimal separation to resolve the above problems. The current subject matter may be configured to implement cross potential point clouds, which may use spatial diversity induced by multiple radars and resolve a problem of noise and/or sparsity in radar point clouds. Moreover, the current subject matter may be configured to include a deep learning architecture that may be configured for radar's sparse data distribution to enable accurate 3D bounding box estimation. The current subject matter's spatial techniques may be considered fundamental to radars point cloud distribution and may be beneficial to various radar sensing applications.

As stated above, autonomous vehicles typically require a high-quality geometric perception of a scene in which they are navigating, even in adverse weather conditions. Most of the conventional computer vision algorithms and/or data-driven techniques rely on high resolution, multi-channel LiDARs to construct accurate 3D bounding boxes for dynamic objects. LiDAR is a light-based sensor which measures a reflection of a light signal to perceive a geometry of a scene, thereby creating one or more dense 3D point clouds. However, LiDAR cannot penetrate through adverse conditions (e.g., fog, dust, snow blizzard, etc.), thus causing the sensor to fail. In contrast, radars may provide a robust sensing solution, which transmits millimeter waves (mm-Waves) and remain less affected by adverse weather conditions. The wavelength of mmWaves allows them to easily pass through such weather conditions, e.g., fog, dust, and/or other microscopic particles.

Although radars are all-weather reliant sensors, they need to provide LiDAR-like high-quality perception performance to enable adverse weather perception. However, a challenge with the radar is that it cannot generate dense and/or uniform point clouds, like LiDAR. One of the reasons for that is that an automotive radar emits mmWave signals, which specularly reflects off the surfaces, unlike light signals that scatter in every direction, thereby allowing only a fraction of incident waves to travel back to the radar receiver.

FIG. 1 illustrates a conventional radar system 100. The system 100 includes an object (e.g., vehicle) 102, and a radar 104. As shown, one or more waves 103 may be reflected back to the radar 104, while others (i.e., waves 105) do not. Even a high angular-resolution automotive radar can suffer from specularity and would only create a sparse point cloud with insufficient information for precise bounding box estimation. To further exacerbate the issue, radar data can include structured noise due to sensor leakage, background clutter, multi-path effects, and other errors. The noise can contaminate the point clouds by causing unwanted points to appear in the scene point cloud. This leads to inaccuracies in identifying a number of objects in the scene by increasing false detections.

To address the above issues with current radar systems, in some implementations, the current subject matter relates to a system (as well as associated methods and/or articles of manufacture) that may enable one or more radar to overcome the challenges posed by specular reflections, sparsity and noise in the radar point clouds, and to provide high-fidelity perception of the scene using 3D bounding boxes. The current subject matter may be configured to include one or more low-resolution radars that may be positioned in an optimal fashion to maximize spatial diversity and/or scene information that may be perceived by the radar(s). The current subject matter may further implement a multi-radar fusion process (together with spatial diversity) to resolve the problem of specular reflections, sparsity and/or noise in radar point clouds. The current subject matter also may be configured to enable detection of multiple dynamic objects in the scene, with their accurate location, orientation and/or 3D dimensions. Further, the current subject matter may enable such perception in inclement weather to allow radar(s) to function as a sensor for autonomous perception.

To overcome specular reflections, the current subject matter may be configured to use one or more (e.g., two) radars that may be positioned at spatially separated locations overlooking the same scene and illuminate an object in the scene from different viewpoints. For example, the radars may be positioned a predetermined distance away from each other. This, in turn, may increase a probability of receiving a reflection back from multiple points/surfaces of the object, which a conventional single radar may have missed (as shown in FIG. 1). In some cases, the optimal placement of multiple low-resolution radars may depend on a goal of achieving multiple reflection points from a vehicle at all orientations. By way of a non-limiting example, an optimal radar placement of radar sensors approximately 1.5 meter apart (e.g., typical width of a car) may be configured to achieve high-fidelity in the estimated pose of the surface. As can be understood other predetermined distance values may be used.

In some implementations, to address noise problem, the current subject matter may be configured to execute a multi-radar fusion process to reduces one or more noise points to enable accurate detection of multiple dynamic objects. Spatial diversity generated by multiple radars may be used to reduce the noise and/or enhance points corresponding to actual dynamic objects (e.g., to eliminate noise). In some cases, the point clouds collected by each radar of the multiple-radar may be translated to a common frame of reference and then combined to densify the radar point cloud. However, this approach may add up the noise points and might not reduce noise and/or miss out on important information/data encoded in the spatial locations of radars.

It is noted that across multiple viewpoints (e.g., radars), noise points may appear independent of each other in space and points belonging to actual surface/object may appear at nearby location consistently in most of the views (e.g., radars). To best leverage this observation, the current subject matter may be configured to generate a space-time coherence based framework for combining of 3D point clouds from multiple radars. The output of the framework may include a representation of cross potential point clouds that may include information regarding confidence of each point coming from an actual object as a soft probability value, along with one or more (or all) properties of a point cloud.

Using the knowledge of confidence estimates for the points, the current subject matter may be configured to determine whether they belong to objects or noise. However, identification of all relevant points out of noise might not be sufficient for a multi-object 3D bounding box estimation. First, depending on the distance, orientation, and/or exposed surface of an object, only a limited set of points might be captured by the radar. Second, in a scene with multiple objects, precise 3D bounding box estimation may require segmenting out the points belonging to each object. This may result in an uncertainty of the exact orientation and/or location of the bounding box.

Some approaches to solve for uncertainty may include designing hand-crafted features by taking into account the shape and size of the vehicles and all possible orientations. However, such an approach is not trivial because crafting features that can incorporate all possible cases may be very challenging.

In some implementations, to address the above problems, the current subject matter may be configured to execute a data-driven deep learning-based process to perform precise 3D bounding box estimation that leverages the sparsity of cross potential point clouds. This process may be configured to combine point cloud segmentation and 3D bounding box location estimation in space, and perform a region of interest (RoI) based classification. However, picking RoIs uniformly throughout the 3D space is not computationally feasible. Thus, the current subject matter may be configured to define a unique set of anchor boxes that allow iteration over all possible configurations of bounding boxes over sparse point clouds. The set of anchor boxes may exhaustively cover all configurations while efficiently reducing the search space.

In some exemplary, experimental configurations, the current subject matter was able to achieve a median error of less than 37 cm in localizing a center of an object bounding box, and a median error of less than 25 cm in estimating dimensions of the bounding boxes. Moreover, the current subject matter was able to achieve an overall mean-average precision (mAP) score (corresponding to an area under the precision-recall (PR) curve, which is a measure of the number of actual boxes detected (recall) along with the accuracy of detections (precision)) of 0.67 with an IoU (i.e., a Jaccard index corresponding to a measure of overlap between predicted bounding box and ground truth box) threshold of 0.5 and 0.94 with an IoU threshold of 0.2 for estimating 3D bounding box, which is comparable to existing bounding box estimation techniques that use LiDARs. Further, using the current subject matter's approach, the mAP values increase to 0.67 compared to 0.45 for a single radar system. This means that the current subject matter provides a performance improvement of 48% with its multi-radar fusion compared to a single radar. Moreover, the current subject matter may be configured to make inference at a frame rate of 50 Hz which is greater than the real-time requirements.

In some implementations, the current subject matter may be configured to provide a framework for radar perception that may leverages spatial diversity induced by multiple radars and optimize their separation, to counter a challenge of specular reflections in mmWave radars. The cross potential point clouds may utilize space-time coherence on point clouds from multiple radars, and reduce the noise in radar point clouds, thereby increasing quality of signal. The current subject matter's deep learning framework may be configured to leverage non-uniform distribution of radar point clouds, and estimate precise 3D bounding boxes on cross potential point clouds, while addressing challenges of specular reflections, radar clutter and noise, as well as sparsity.

With regard to specular reflections, for an incident electromagnetic wave on a surface, the size of its wavelength compared to the roughness of the object's surface determines the degree of scattering of the wave. mmWaves undergo a negligible scattering effect, resulting in a specular reflection (angle of incidence equals angle of departure) from the surfaces. Consequently, for a small aperture radar, a lot of reflected signal does not make its way back to the sensor, causing blindness of the objects. The blindness may be independent of the resolution capabilities of sensors.

Radar detections are commonly known to be polluted by signals from clutter, noise, and multi-path effects. Radar clutter is defined as the unwanted echoes from the ground or other objects like insects that can be confused with the objects under consideration. In a congested environment like cities, a signal emitted by a radar sensor could suffer multiple reflections before coming back to the sensor. The result is the formation of ghost objects, which are reflections of actual objects in some reflector formed because of multipath.

Outdoor scene point clouds are inherently sparse due to the empty volume between the objects, which are at a substantial distance from each other. Additionally, due to different interaction properties of mmWaves with different objects (non-uniform interactions), this effect is compounded in the case of mmWave radars. The result is a sparse and non-uniform point cloud.

As stated above, the current subject matter may resolve each of the above challenges to provide accurate bounding boxes by combining multiple radar fusion with a noise filtering algorithm to estimate the bounding boxes.

Figure 2:
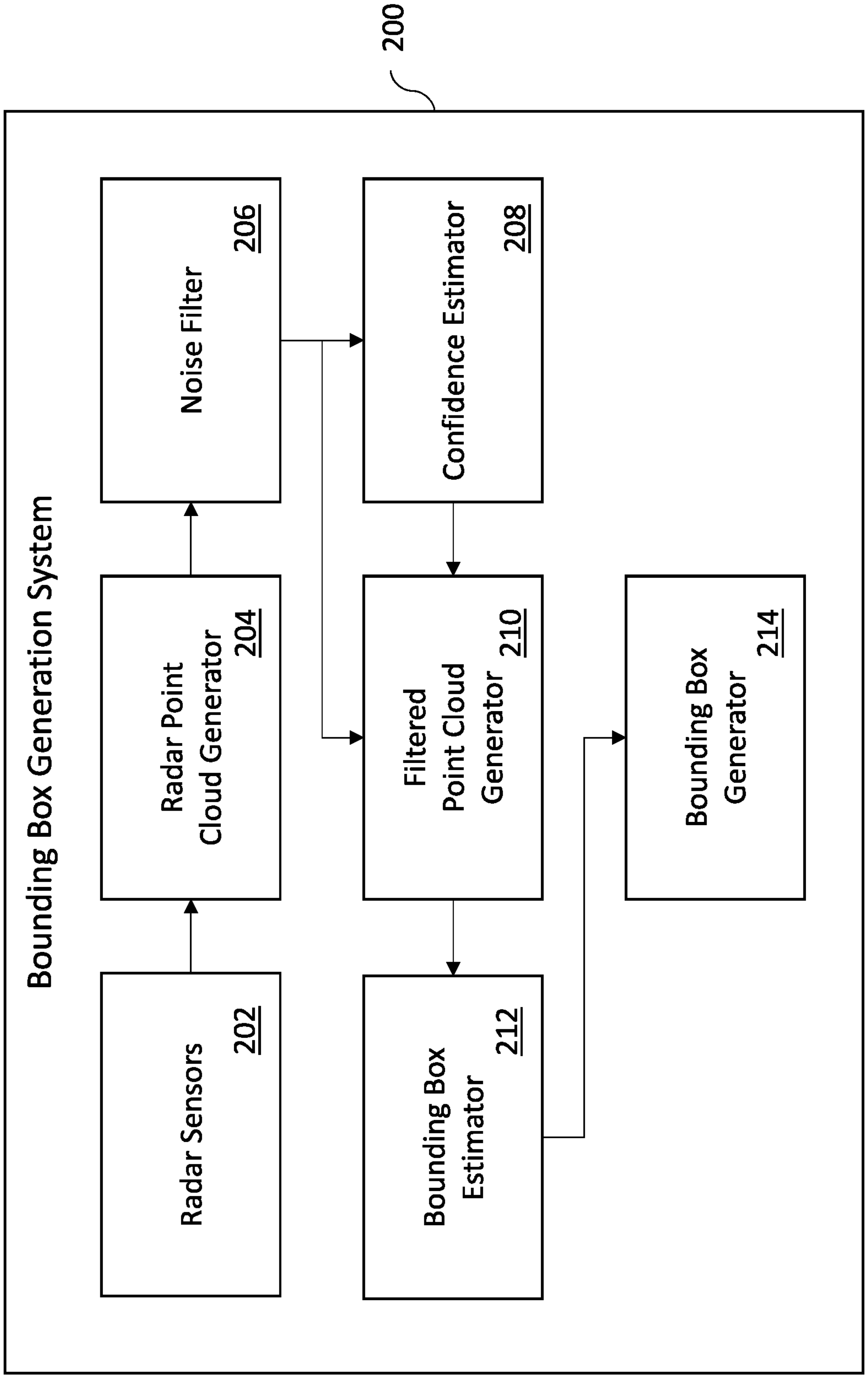
FIG. 2 illustrates an exemplary system for performing bounding box estimation, according to some implementations of the current subject matter.

FIG. 2 illustrates an exemplary system 200 for performing bounding box estimation, according to some implementations of the current subject matter. The system 200 may be configured to include radar sensors 202 that may be positioned at a predetermined distance apart on an object, such as, for example, a vehicle (e.g., on a front of a vehicle, a side of a vehicle, etc.), a radar point cloud generator 204, a noise filter 206, a confidence estimator 208, a filtered point cloud generator, a bounding box estimator 212, and a bounding box generator 214. The computing elements or components 202-214 may be configured to be used for generation of one or more bounding boxes that may be used to encompass an object that may be located in a surrounding environment of the vehicle.

One or more of the elements 202-214 may include a processor, a memory, and/or any combination of hardware/software, and may be configured to generate one or more bounding enclosures or "boxes" (referred to herein as a "bounding box" or "object bounding box" for ease of discussion or illustration). In some cases, generation of the bounding boxes may be configured to rely on data, functions and/or features (and/or any combination thereof) of one or more components/elements 202-214. An object bounding enclosure or box may correspond to a virtualized/virtual enclosure of an object in an environment of another object, thereby allowing for one object to have a machine vision of another object. Such virtualized/virtual enclosure may allow objects to "see" one another and/or determine their locations, shapes, movement directions, and/or any other details. The enclosure may have any desired shape (e.g., square, rectangular, triangular, object shape, complex shape, etc.), form, size, and/or any other characteristics. It may also be positioned about the object in any desired fashion as well, e.g., it may be larger than the object (e.g., a vehicle), it may have one or more dimensions corresponding to one or more dimensions of the object, etc. The enclosure may have any number of dimensions (e.g., 2D, 3D, etc.). A computing component may refer to a software code that may be configured to perform a particular function, a piece and/or a set of data (e.g., data unique to a particular user and/or data available to a plurality of users) and/or configuration data used to create, modify, etc. one or more software functionalities associated with a particular workflow, sub-workflow, and/or a portion of a workflow. The system 200 may include one or more artificial intelligence and/or learning capabilities that may rely on and/or use various data, as will be discussed below.

The elements of the system 200 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The elements of the system 200 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

Figure 3:
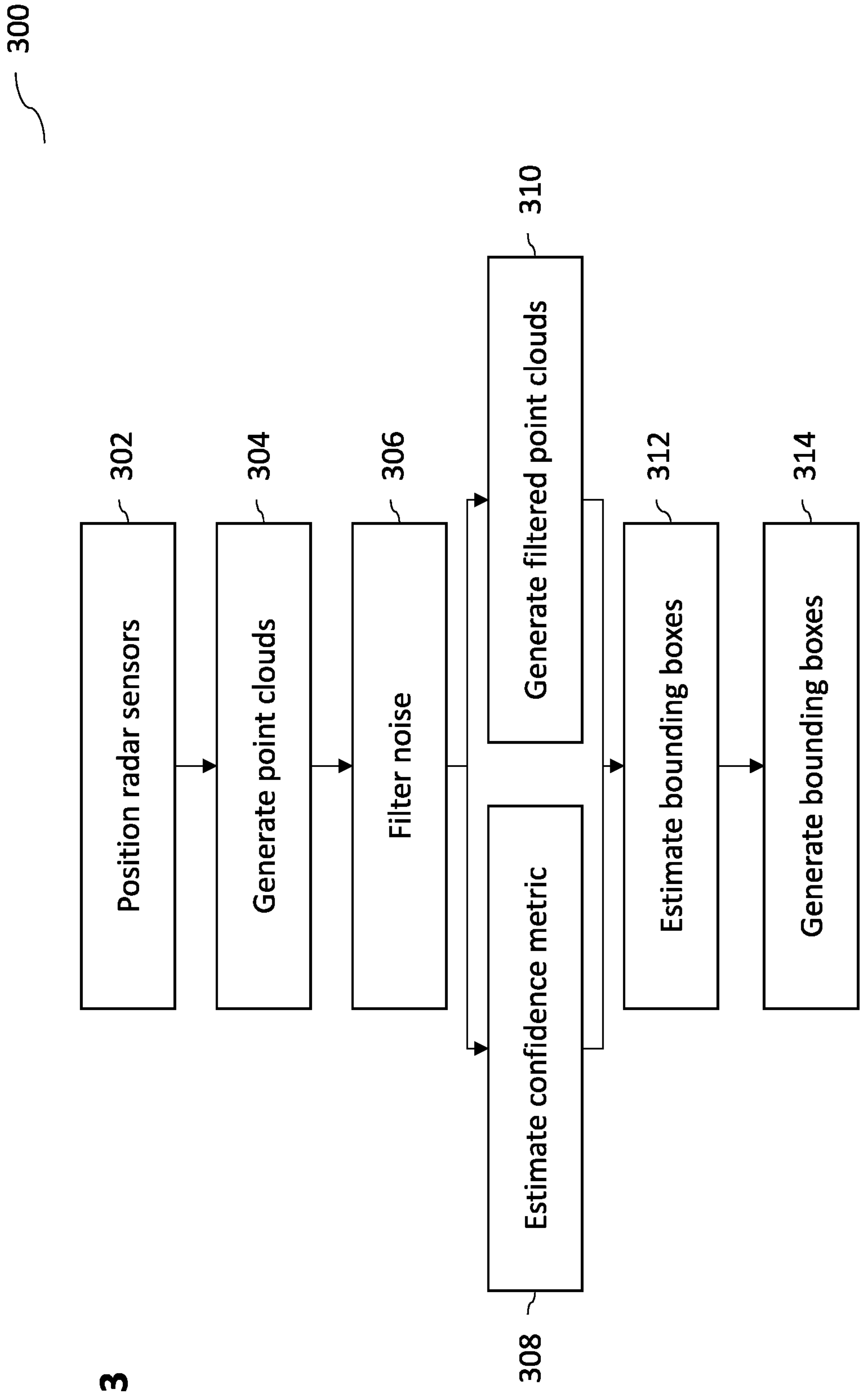
FIG. 3 illustrates an exemplary process for performing bounding box estimation, according to some implementations of the current subject matter.
Figure 5A:
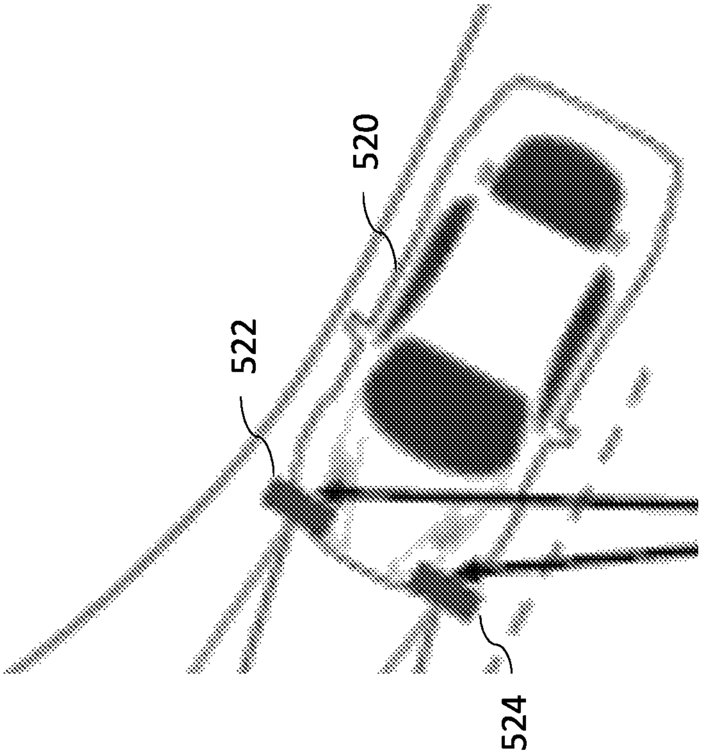
FIG. 5*a* illustrates an exemplary vehicle having radar sensors and positioned a predetermined distance apart, according to some implementations of the current subject matter.

FIG. 3 illustrates an exemplary process 300 for performing bounding box estimation, according to some implementations of the current subject matter. The process 300 may be performed by the system 200 shown in FIG. 3. At 302, radar sensors (e.g., sensors 202) may be positioned on a vehicle, where, for example, the radar sensors may be positioned at a predetermined distance apart. FIG. 5*a* illustrates an exemplary vehicle 520 having radar sensors 522 and 524 positioned a predetermined distance apart, according to some implementations of the current subject matter. The radar sensors may be configured to transmit and receive signals. A signal that a radar may receive may correspond to a reflection of that signal from another object. Alternatively, or in addition, one radar may receive a signal from an object, where the signal has been transmitted toward the object by another radar. The current subject matter system may be configured to determine the origin (i.e., first radar) of the transmitted signal that has been received by the second radar and process the signals. This may allow radars to "talk" to each other, thereby not requiring that the signal transmitting radar has to be the radar to receive the signal resulting from the reflection of the transmitted signal. As such, the current subject matter system may be provided with further flexibility and versatility to ensure that the system is capable of detecting signals even if one or more of the radars becomes inoperative.

Figure 5B:
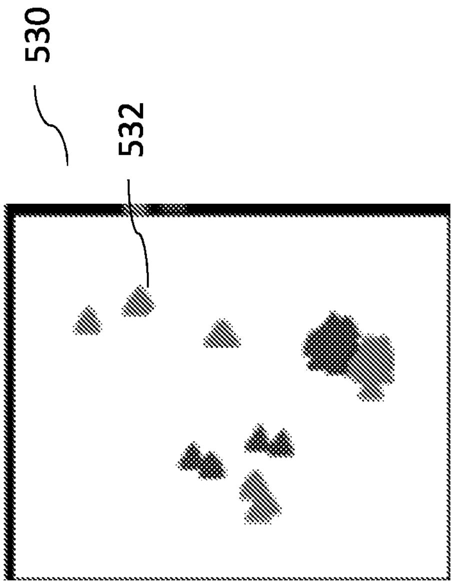
FIG. 5*b* illustrates an exemplary point cloud having one or more cloud points, according to some implementations of the current subject matter.

At 304, the system 200, using, for example, a radar point cloud generator 204, may be configured to generate one or more representations (e.g., referred to as point clouds hereinafter) that may be used for the purposes estimating one or more object bounding boxes that may be configured to enclose one or more objects in an environment of the vehicle. FIG. 5*b* illustrates an exemplary point cloud 530 having one or more points 532, according to some implementations of the current subject matter.

At 306, the system 200 may be configured to apply noise filtration to reduce noise and enhance points corresponding to actual dynamic objects. At 308 and 310, one or more confidence metrics for the generated point clouds and/or one or more filtered point clouds and/or cross-potential point clouds may be generated using components 208 and 210 of system 200, respectively.

Figure 5C:
FIG. 5*c* illustrates an exemplary virtual bounding boxes positioned around a vehicle, according to some implementations of the current subject matter.

The process 300 may be configured to conclude with generation of an estimate (at 312) of one or more bounding enclosures or boxes and subsequent generation (at 314) of one or more object bounding boxes. FIG. 5*c* illustrates an exemplary virtual bounding boxes 542 and 544 positioned around a vehicle 540, according to some implementations of the current subject matter. The boxes 542-544 may be positioned as a result of the process 300. Further details of the process 300 are discussed below.

Specular reflections of millimeter waves can cause direct blindness of object surfaces, which could lead to fatal accidents. To better scrutinize the effect of specularity, it is important to understand a distribution of a radar point cloud. Point cloud generated by a radar may depend on the following: a geometry of the scene and a resolution of the radar. An adverse effect of specular reflections is a geometric problem and cannot be resolved simply by increasing the resolution of the radar.

Figure 4:
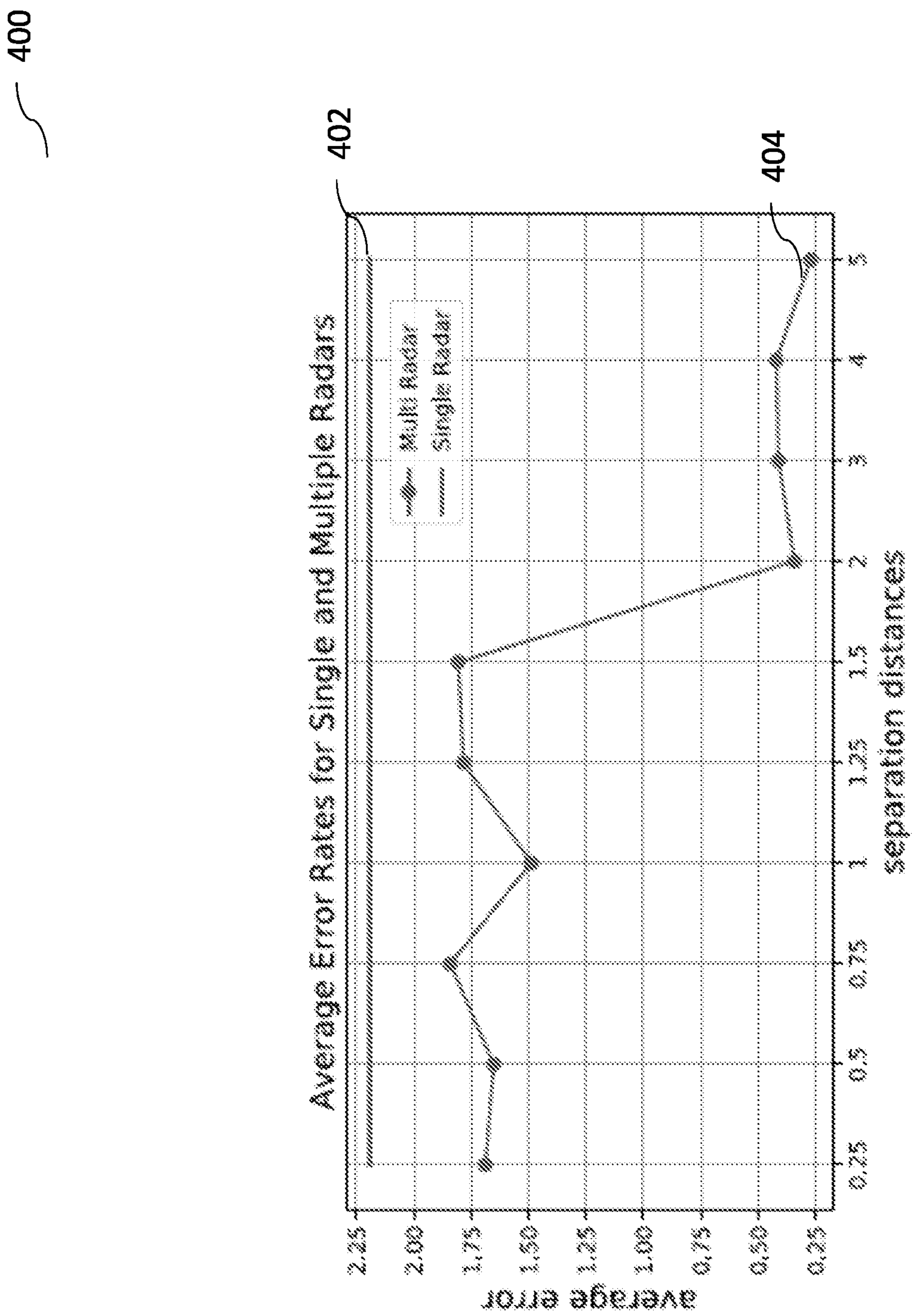
FIG. 4 is an exemplary plot illustrating a comparison between experimental single-radar and multiple-radar systems.

For a rectangular bounding box of a car, the current subject matter system that uses multiple radars, may be configured to capture more surface points and thus be less affected by specularity, to thereby better estimate the bounding box's orientation. To understand the optimal separation of such a multiple radar system, simulations may be used. In particular, to estimate the orientation angle of the box from point clouds, a multi-layer perceptron (MLP) regressor trained on the data generated from the simulations may be used. The MLP regressor may receive a simulated point cloud as input and output an orientation angle of a vehicle. FIG. 4 is an exemplary plot 400 illustrating a comparison between experimental single-radar and multiple-radar systems. In particular, the plot 400 illustrates an error rate 402 of angle estimation in a single-radar system and an error rate 404 in a multiple-radar system. As shown in FIG. 4, the error rate plots 402, 404 show that the multiple-radar system outperforms a single radar system. Moreover, a sharp increase in performance for a multiple-radar system can be seen for the radar location separations between 1.5 m and 2 m. The width of an average vehicle (e.g., a passenger vehicle) is approximately 1.7 m. As such, the plot 404 illustrates that an exemplary, non-limiting optimal distance between two radars for estimating a bounding box on a vehicle may be comparable to the vehicle's width.

Figure 5D:
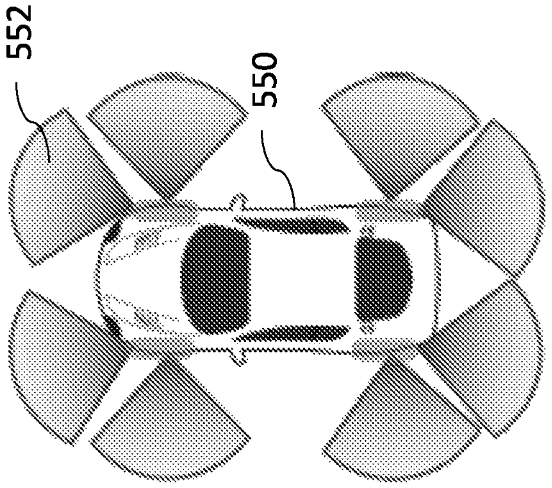
FIG. 5*d* illustrates exemplary visibility field of view of a different vehicle regions.

In some implementations, use of multiple radars 202 (as shown in FIG. 2, e.g., as positioned during operation 302 of method 300 shown in FIG. 3) may provide one or more of the following benefits: a larger virtual aperture, larger number of points in a point cloud, as well as rich spatial diversity. With regard to the larger virtual aperture, reflections arriving from a vehicle may originate from specific scattering points around the vehicle (e.g., wheelhouses, corners, etc.). Each scattering point may have a specific visibility region. Exemplary visibility regions 552 of a vehicle 550 are illustrated in FIG. 5*d*. Thus, multiple radars present at spatially separated locations may generate a larger virtual aperture, thereby capturing more of these scattering centers. Occluded parts of an object from one viewpoint may appear in the another viewpoint, thereby increasing probability of capturing more points, which may directly impact the system 200's bounding box orientation estimation performance. Further, one of the advantages of having multiple sensors may include an increase in the number of points, which may densify a sparse point cloud. Additionally, a larger virtual aperture with multiple radars may provide for a rich spatial diversity, which may be used to reduce noise by building confidence for the points in the point cloud.

As stated above, multiple radars may be configured to work together to overcome challenges posed by specular reflections of mmWaves by providing rich spatial diversity. However, noise (e.g., due to clutter, multi-path, system noise, etc.) may present a challenge for object detection from radar point clouds. Noise points may misguide object detection and introduce false positives. A single radar has fundamental limitations in removing noise. The features corresponding to the Cartesian coordinates, e.g., (x, y, z) and velocity, may provide a rich context for object detection. However, they do not provide information necessary to segregate the noise.

In some implementations, to resolve these issues, the current subject matter may be configured to generate a representation of cross potential point clouds that may be formed by fusing multiple radar point clouds. It should be noted that points belonging to noise may be independent across multiple radars placed at different spatial locations. This means that points belonging to an actual object may be more likely to be present in the point clouds of more than one radar. In contrast, points belonging to random noise may be specific to each radar. By leveraging this observation, the current subject matter system 200 may be configured to filter noise from radar point clouds and create low-noise cross potential point clouds, as discussed below.

Noise harms bounding box estimation as it generates false positives. In some implementations, the system 200 may be configured to use signal processing techniques to address noise and generation of false positives. In signal processing, multiple noisy data streams may be collected and averaged to reduce noise variance and improve an overall signal to noise ratio (SNR), whereby signals present in each data stream may add up coherently. At the same time, noise is random and will not add constructively. However, in point clouds, it is not possible to simply add point clouds from multiple radars to reduce noise because (1) a 3D point cloud is sparse and incoherent in space, i.e., multiple radars may capture different points in 3D space for the same target object, and (2) it is hard to build confidence for every point, whether it contributes to the object bounding box or corresponds to the noise point (e.g., as generated by clutter and/or multi-path).

To apply space coherence in the point cloud domain, the system 200 may be configured to use geometric information of point clouds. Thus, if a region of 3D space generates a response in multiple radars, it is likely to be generated from an object and not noise. To capture this effect, the system 200 may measure coherence between point clouds originating from multiple radars across 3D space. Radar points from an object may be concentrated around some scattering regions on a vehicle. By identifying these scattering regions as cluster of points, the system 200 may define a confidence of a point being generated from an object by looking at the same scattering region in multiple radar point clouds (i.e., space coherence). The system 200 may then perform enforcing space coherence by defining cross-potentials.

Since radar point clouds may be present in the form of clusters of points originating from a scattering region on the object, to cluster the point clouds, the system 200 may be configured to use a conventional DBSCAN clustering algorithm to find clusters in the point cloud. DBSCAN may define a neighborhood of points based on distance ϵ given as an input parameter. If a specific number of points (e.g., another input parameter) is present in that neighborhood, the point and its neighborhood may be identified as a cluster. For each cluster i, the centroid $c_i$ of its points may be used as the cluster's representative point. For the multi-radar case, $$c_i^j$$

may be used to represent the centroid of cluster i in the point cloud of jth-radar, which is represented by $\Gamma_j$. In this way, multiple clusters may be generated individually for each radar point cloud.

Next, the system 200 may be configured to determine correspondence between clusters across multiple radars. To do so, the system 200 may define a cross-potential between two clusters from two different radars as a confidence metric if the two clusters belong to the same object. The cross-potential between two clusters may be inversely proportional to the distance between the two clusters' centroids. Assuming the cross-potential as $$P(c_i^j|\Gamma_k)$$

for the ith cluster in radar j (where $$c_i^j$$

denotes its centroid) with the kth radar for k≠j, k∈{1, 2, . . . , N} in an N-radar system. Thus, the cross-potential may be expressed as follows:

$$P(c_i^j|\Gamma_k) = \frac{1}{1 + \left[\frac{r_i^{jk}}{2}\right]^2} \tag{1}$$

where $$r_i^{jk}$$

is the distance between centroid $$c_i^j$$

from the respective nearest cluster centroid in kth-radar's point cloud $\Gamma_j$.

In some implementations, the above cross-potential may depend on dimensions of a particular vehicle, e.g., a typical passenger vehicle has a width of approximately 2 m. Thus, by way of a non-limiting example, the system 200 may select a function that generates a high potential to all points within the predetermined distance D (e.g., 2 m) neighborhood of a point, e.g., P>0.5 if $$P > 0.5 \text{ if } r_i^{jk} < D(\text{e.g., } 2m).$$

The choice of potential function may also preserve a point lying on a vehicle, which is present in only one radar, as long as it is in the predetermined distance (e.g., 2 m) neighborhood of another high potential point (e.g., on the farther corner along the width). With this, any extra points added due to the spatial diversity of the multiple radar system may be preserved. Using this potential function, the system 200 may quantify a space coherence of signals being received from multiple radars. The system 200 may then combine all points being received from multiple radar point clouds and add confidence information to them. Each point may be assigned the same potential as its respective cluster centroid. Further, the system 200 may filter all points below a certain predetermined potential-threshold to generate cross potential point clouds (CPPC).

Figure 6:
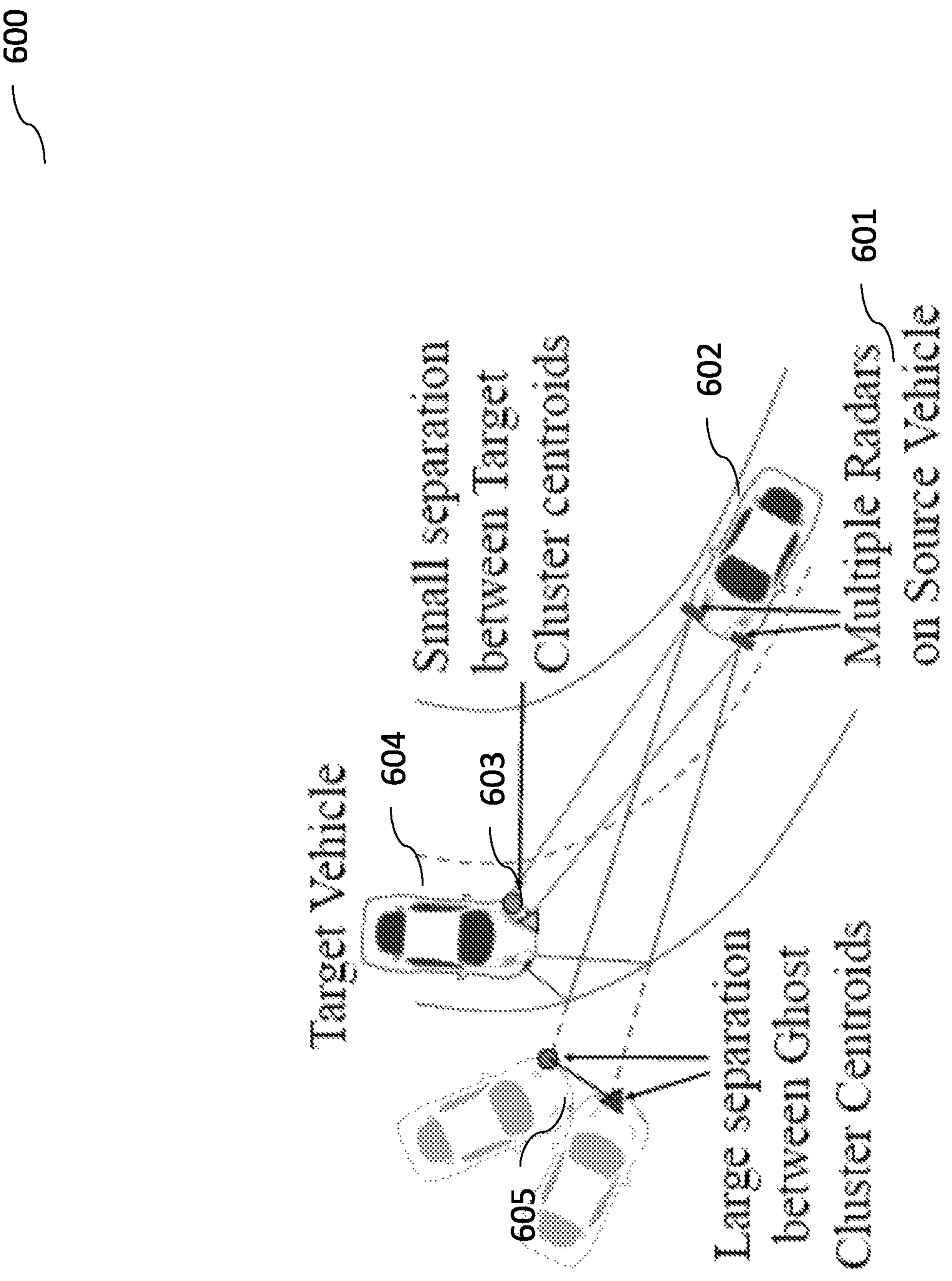
FIG. 6 illustrates an exemplary system showing application of the cross potential point cloud process, according to some implementations of the current subject matter.

FIG. 6 illustrates an exemplary system 600 showing application of the cross potential point cloud process, according to some implementations of the current subject matter. The system 600 may include a first or a source vehicle 602 and a second or a target vehicle 604. The vehicle 602 may include multiple radars 601 that may be positioned at a predetermined distance from each other. The radars 601 may be configured to detect the target vehicle 604. During detection, one or more ghost clusters may be formed due to multipath issues (one resulting in a small separation 603 between target cluster centroids, and one resulting in a larger separation 605 between ghost cluster centroids). In some implementations, a threshold value may be selected for the purposes of performing the CPPC process, where signal-to-noise ratio (SNR) of a point cloud may be defined as a ratio of a total number of actual points against noise points. Noise points may be defined as points lying outside the bounding box of the vehicle. An improvement in SNR may increase with a higher potential threshold but may diminish returns for large threshold values. Further, a large threshold may decrease the SNR but may also cause some missed detections. In some exemplary, non-limiting implementations, a threshold value 0.5 may be selected to balance SNR improvement and missed-detections.

Further, space coherence may help determine an amount of noise from an actual signal and improve detection performance. To do so, the system 200 may be configured to determine that along with the space coherence across radars, the points may also follow a time coherence across multiple frames from radar. For a point originating from a rigid body, the linear motion may be the same as the vehicle's motion across multiple time frames. The system 200 may be configured to track movement of points in consecutive frames and use it to estimate vehicle's heading direction. The system 200 may be configured to perform tracking on self-motion compensated frames to remove an effect of the source vehicle movement. In some implementations, Kalman filter-based corrections may be used to resolve sensor uncertainties and/or noise. The system 200 may track points with the highest cross-potentials for each object. Using the time coherence between points, the system 200 may obtain a prior estimate of vehicles' heading directions in a scene (e.g., a surrounding environment about the vehicle, e.g., vehicle 602 shown in FIG. 6).

Using multiple radar fusion to generate cross potential point clouds (as shown in FIG. 3 at 310), the system 200 may be configured to reduce noise and potentially eliminate inaccuracy in detecting a number of dynamic objects. The system 200 may then estimate a number of dynamic objects and their bounding boxes (at 312 as shown in FIG. 3). To do so, a mapping function of radar may be used, which, in view of a scene geometry of multiple vehicles and environment, may be expressed as follows (i.e., a radar maps it to point cloud information as):

$$x, y, z = \mathcal{F}\text{(scene geometry)} \quad (2)$$

The system 200 may then inverse this mapping and estimate the scene geometry in terms of object bounding boxes, as follows:

$$(p_N, \psi_N) = \mathcal{D}(\Gamma_{CPPC}) \quad (3)$$

where N is the unknown number of objects present in the scene; $\Gamma_{CPPC}$ is cross potential point clouds where each point is denoted by its Cartesian coordinates, velocity, intensity and CPPC confidence; $p_N$ represents the confidence of detection for Nth objects' bounding box in a scene and $\psi_N$:$\{c_x, c_y, c_z, w, h, l, \theta\}$ denotes the tuple of bounding box parameters which are center coordinates, dimensions and yaw angle (i.e., an angle with respect to z-axis) respectively. $\mathcal{D}$ is the multiple 3D bounding box estimation system.

Estimating 3D bounding boxes for objects from a radar point cloud depends on proper segmentation of radar point cloud. In particular, a radar point cloud of a scene is sparsely distributed where any subset of points could belong to a single object. Also, the number of objects and their locations are not known a priori. Bounding box estimation requires proper segmentation of points belonging to each object in the scene. This is a complex mapping problem where the number of targets is not known. Moreover, radars can only see a part of an object which is exposed to the sensor. Thus, the point cloud of an object may not contain crucial information regarding all dimensions, orientation, and center-location of the bounding box. As a result, there is uncertainty in bounding box parameters.

Figure 7:
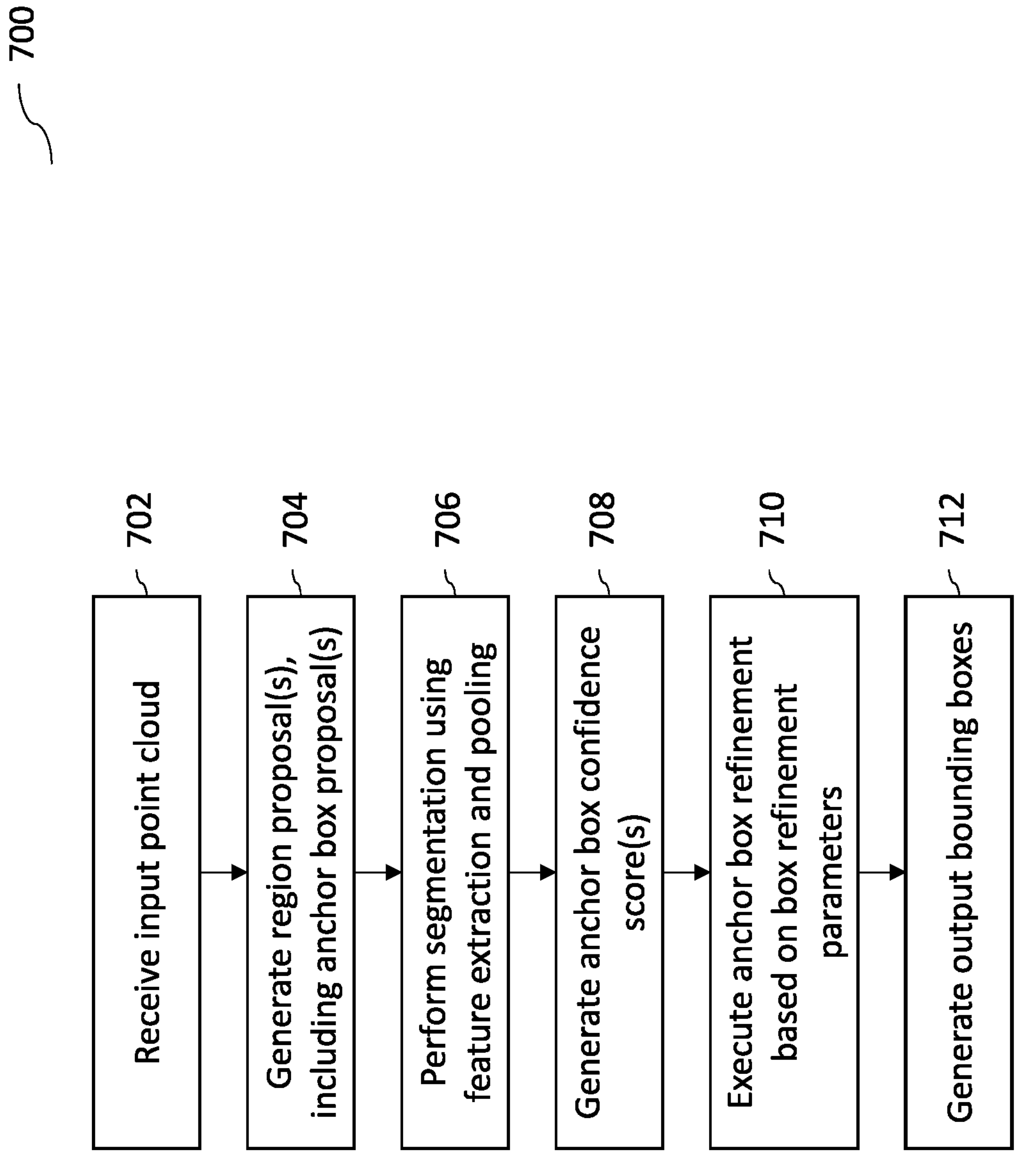
FIG. 7 illustrates an exemplary process for generating output 3D bounding boxes, according to some implementations of the current subject matter.

To overcome the challenges mentioned above, in some implementations, the system 200 may be configured to include a deep learning architecture designed to handle the sparsity in radar point clouds and output accurate 3D bounding boxes. FIG. 7 illustrates an exemplary process 700 for generating output 3D bounding boxes, according to some implementations of the current subject matter. The process 700 may be performed by one or more elements of the system 200 shown in FIG. 2.

The process 700 may be configured to generate one or more anchor boxes based on the radar response due to vehicle geometry and space-time coherence. Unlike LiDAR, where many points originate from ground and other static objects, e.g., buildings, radar data is sparse and contains mostly the points from dynamic and metallic objects like vehicles after CPPC noise suppression due to strong electromagnetic (EM) reflective properties of metals. Specifically, the sparsity in radar data and the fact that all the points originate from the vehicles' surface allow defining point-based region proposals. These fixed size anchor boxes may be used as initial estimates of 3D bounding boxes. The size of the anchor boxes may be determined using an average size of vehicles in the training dataset. Instead of the entire scene point cloud, the process 700 may be executed separately on each of these anchor boxes. For each of these anchor boxes, the task is reduced to generate a confidence number p of whether points inside that anchor box belong to an object.

Confidence scores may be generated for all anchor boxes. A set of high confidence boxes may be selected. These anchor boxes may be passed through a refinement stage that may solve the uncertainty issue in bounding box parameters. In this stage, the anchor boxes may be refined to generate accurate 3D bounding boxes of the objects present in the scene (e.g., as represented by parameter $\psi$).

Referring to FIG. 7, the system 200 may receive CPPC as an input, at 702. The CPPC may, for example, include 6 channels corresponding to x, y, z coordinates, velocity, peak intensities, and cross-potential values for each point. Once the CPPC input is received, region proposal, in form of anchor boxes may be generated, at 704. For a particular scene with multiple vehicles, region proposals may be defined by placing multiple anchor boxes in the scene. As mentioned above, a novel point-based region proposal (e.g., anchor boxes) generation scheme based on the radar response due to vehicle geometry and space-time coherence may be used. For a particular point, the system 200 may use five different placements of anchor box around the point (e.g., referred as an anchor point for those anchor boxes). The pose values derived for each anchor point using space-time coherence for the orientation angle may be used.

At 706, segmentation using feature extraction and pooling may be performed. Here, the system 200 may be configured to perform classification and 3D bounding box parameter regression by learning meaningful feature representations from the point cloud data. The system 200 may be configured to extract these features before and after generating anchor boxes. For extraction of features before generation of anchor boxes, a point-net encoder of shared multi-layer perception (MLP) may be used to extract features from the entire point cloud. During extraction of features after generation of anchor boxes, the anchor boxes may be determined for each point. The system 200 may be configured to use a region of interest (RoI) feature pooling block to pool features from all points inside an anchor box. These features may be passed through another point-net layer and then max-pooled into a single representative feature for every anchor box defined per scene.

At 708, the system 200 may be configured to generate or predict an anchor box confidence score. The entire set of representative features of anchor boxes, obtained at 706, may be passed through a classification network that may include fully connected layers. The fully connected layers may learn a mapping from anchor boxes' representative features to the confidence value for each box.

Performing classification on RoI based max-pooled features may ensure that the contextual information from all neighborhood points of the anchor point, lying inside the anchor box is accounted, thereby leading to better classification results. Here, the problem of segmentation may be solved by the system 200 by performing classification directly on the anchor boxes. The system 200 may learn to select the corresponding anchor box with high confidence, which may include all points belonging to an object.

At 710, the anchor box refinement may be executed by refining of box parameters. As discussed above, at 708, the generated anchor boxes may correspond to rough estimates of the dimensions, center, and orientation of final 3D bounding boxes since fixed-size anchor boxes were used. The system 200 may be configured to perform further refinement of these parameters to generate accurate bounding boxes, which may estimate accurate dimensions and location of the boxes. After the classification step (at 708), confidence scores for all the anchor boxes may be determined and since anchor boxes were generated for each point, there may be one or more overlapping high confidence boxes belonging to the same object. The system 200 may be configured to perform non-maximal suppression (NMS) sampling on this set using the confidence values. NMS sampling may remove boxes which have a high overlap with another high confidence box of the same object. The representative features from the remaining anchor boxes may be passed through three fully connected layers to output a tuple [h', w', l', x', y', z', θ'] corresponding to refinements of length, breadth, height, center coordinates, and orientation angle, respectively. These refinements may be added to the anchor box parameters to generate the final 3D bounding box prediction, at 712.

The anchor box classification in the first stage of the process 700 is a binary classification problem that uses a cross-entropy loss represented by $$\mathcal{L}_{RPN} = \sum_{i=1}^{N} -(y_i \log(p_i) + (1 - y_i)\log(1 - p_i)) \tag{4}$$

where $y_i$=[0, 1] is the ground truth and $p_i$ is the predicted confidence value. Refinement of the bounding boxes is a regression problem and Smooth-$L_1$ loss may be used for this purpose. The loss may be represented as follows:

$$\mathcal{L}_{refinement}(r, r') = \begin{cases} \frac{1}{2}(r - r')^2, & \text{for } |r - r'| < 1. \\ \delta|r - r'| - \frac{1}{2}, & \text{otherwise.} \end{cases} \tag{5}$$

where r and r' are ground truth and regressed refinement values respectively for each parameter [h', w', l', x', y', z', θ'].

Figure 9A:
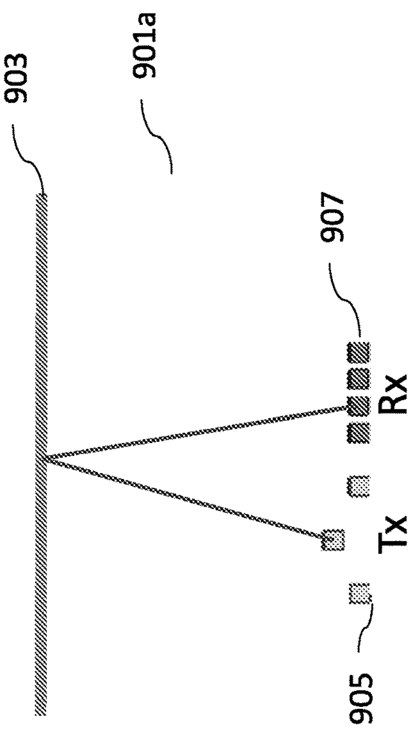
FIGS. 9*a-c* illustrate various exemplary multiple radar systems.
Figure 9B:
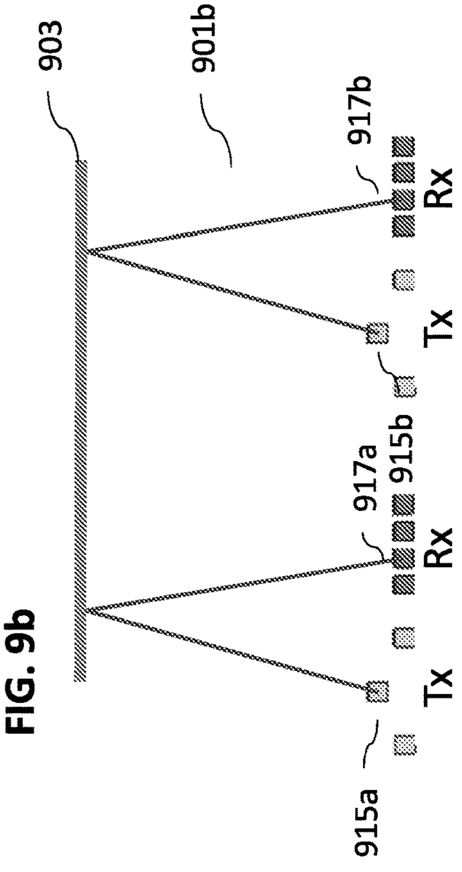
Figure 9C:
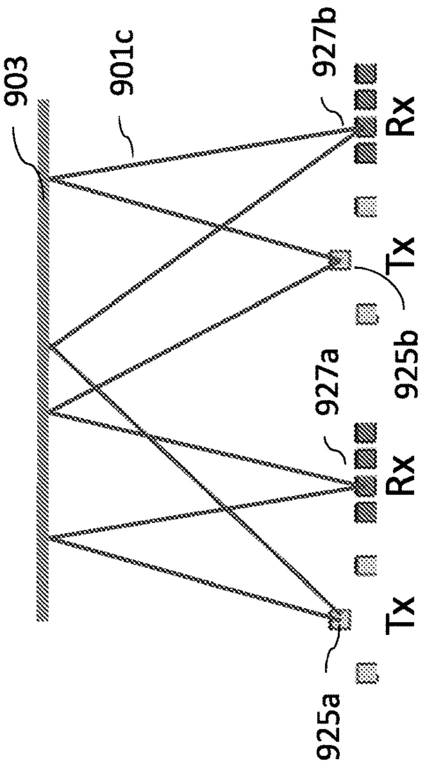

FIGS. 9*a-c* illustrate various multiple radar systems. Multiple radars may be used to increase an aperture (e.g., corresponding to an ability to receive/transmit signals) of a signal transmission system. In particular, multiple-input, multiple-output (MIMO) systems allow multiple transmitters to operate synchronously with multiple receivers. In some implementations, the current subject matter system may include radar sensors that may be time-synchronized to allow self- and/or cross-talk between radar sensors, thereby increasing an aperture of the system and allow for the reception of more signals. This, in turn, may allow generation of more detailed representation of objects (e.g., denser and/or richer point clouds).

FIG. 9*a* illustrates an exemplary single radar system 901*a*. The system 901*a* may include a single transmission radar 905 and a single receiving radar 907. The transmission and receiving radars may be part of a single radar or multiple radars. A signal transmitted by the transmission radar 905 may be reflected by an object/surface 903 and received by the receiving radar 907.

FIG. 9*b* illustrates an exemplary multiple radar system 901*b*. The system 901*b* may include a first transmission radar 915*a*, a first receiving radar 917*a*, a second transmission radar 915*b*, and a second receiving radar 917*b*. The radars 915*a* and 917*a* may be part of a single radar sensor. Similarly, radars 915*b* and 917*b* may be part of another single radar sensor. A signal transmitted by the transmission radar 915*a* may be reflected by the object/surface 903 and received by the receiving radar 917*a*. Likewise, a signal transmitted by the transmission radar 915*b* may be reflected by an object/surface 903 and received by the receiving radar 917*b*. The radars 915*a-b* and 917*a-b* might not be time-synchronized and do not allow for cross-talk (i.e., where a signal transmitted by one transmission radar may be received by one or more receiving radars). In the system 901*b*, only self-talk is allowed, i.e., a signal transmitted by radar 915*a* can only be received by radar 917*b*, and signal transmitted by radar 915*b* can only be received by radar 917*b*.

FIG. 9*c* illustrates an exemplary self- and cross-talk multiple radar system 901*c*. The system 901*c* may include a first transmission radar 925*a*, a first receiving radar 927*a*, a second transmission radar 925*b*, and a second receiving radar 927*b*. The radars 925*a* and 927*a* may be part of a single radar sensor. Similarly, radars 925*b* and 927*b* may be part of another single radar sensor. A signal transmitted by the transmission radar 925*a* may be reflected by the object/surface 903 and received by the receiving radar 927*a* and/or radar 927*b*. Likewise, a signal transmitted by the transmission radar 925*b* may be reflected by an object/surface 903 and received by the receiving radar 927*b* and/or 927*a*. The radars 925*a-b* and 927*a-b* are time-synchronized and allow for cross-talk.

Figure 9D:
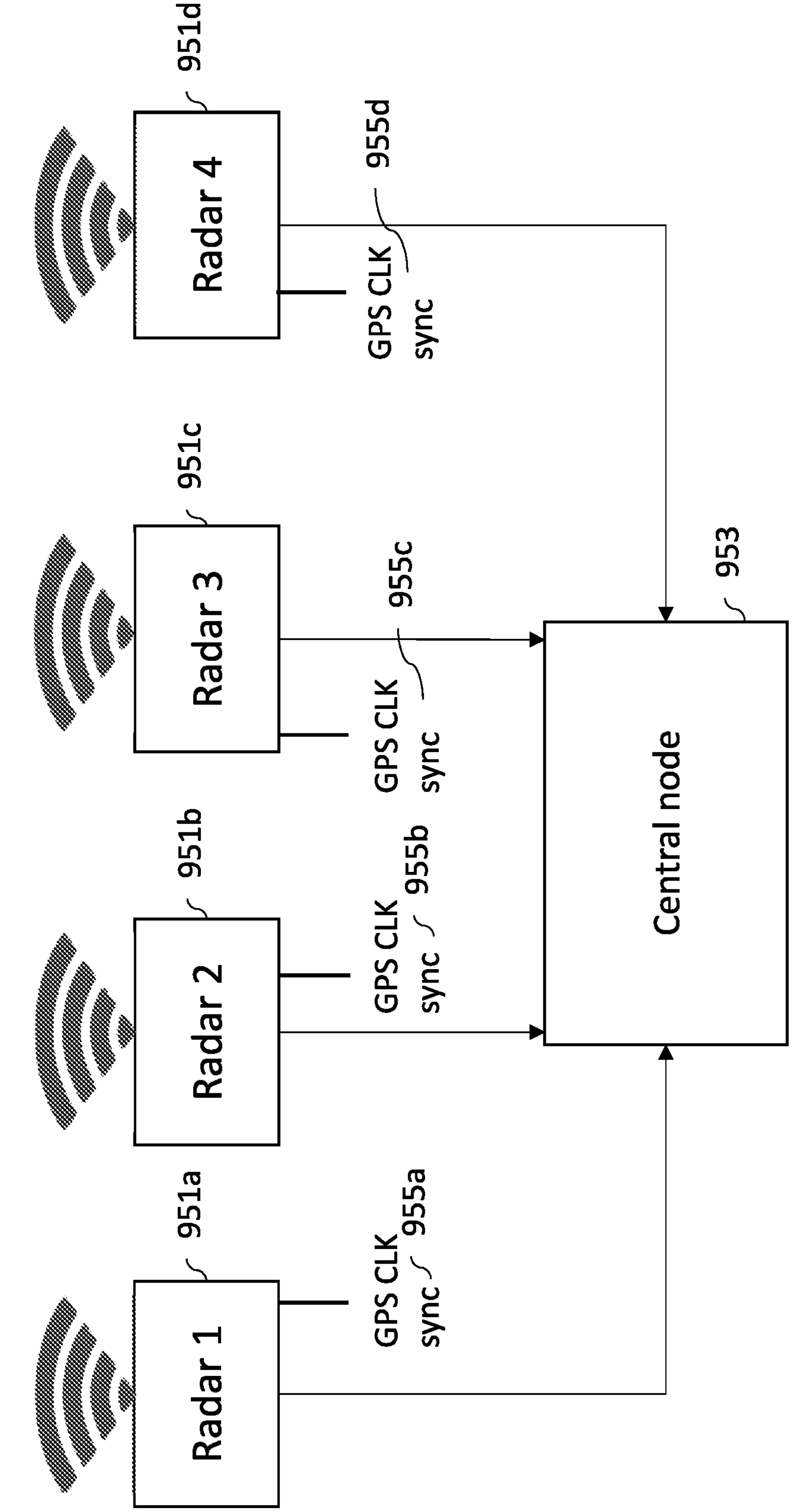
FIG. 9*d* illustrates an exemplary multi-radar system, according to some implementations of the current subject matter.

FIG. 9*d* illustrates an exemplary multi-radar system 950, according to some implementations of the current subject matter. The system 950 may include multiple radar sensors (e.g., "Radar 1", "Radar 2", "Radar 3", "Radar 4", etc.) 951 (a, b, c, d). The radars 951 may be communicatively coupled (e.g., via one or more wired, wireless, etc. communication links) to a central node 953 that may be configured to process signals received, reflected, and/or transmitted by one or more radars 951. The signals may be transmitted by one of the radars 951 and may be received by the same and/or different radars 951. Upon and/or during receiving and/or transmitting of signals, the radars 951 may be configured to provide data associated with such signals to the central node 953, which may include one or more processors, memory and/or storage locations, input/output components, etc.

In some implementations, synchronization clocks 955 (a, b, c, d) (e.g., global positioning system (GPS) based synchronization clocks) may be communicatively coupled and/or integrated with each radar 951, respectively. Alternatively, or in addition to, one clock may be associated with more than one radar 951. The radars 951 may be synchronized using the synchronization clocks 955. To perform synchronization, one or more radars 951 may be selected as leader device and its clock may be synchronized across other radars 951. Using the synchronized clocks and known positions of the radars 951, the central node 953 may determine transmission origin of any received signals (e.g., a signal received by radar 951*b* at time t1 may be determined to be a reflected signal of a signal that has been transmitted by radar 951*a* at time t0). As can be understood, there may be other ways of synchronizing clocks of radars and/or determining origins of the received signals. Once the signals are received, the central node 953 (which can be incorporated into the system 200 shown in FIG. 2) may process the signals and perform the processes discussed above in connection with FIGS. 2-8*c*.

EXEMPLARY EXPERIMENTAL RESULTS

The current subject matter system was tested using a dataset containing 54,000 radar frames. A train test split of 9:1 was used. The data used for testing was obtained from separate data collection runs than training data to ensure generalization. Performance of the current subject matter was compared against LiDAR in bad weather conditions. The IoU and mAP metrics were used to assess performance of the system. As stated above, IoU is a measure of the overlap between the predicted bounding box and the ground truth box. 3D IoU is defined by $$\frac{\text{Intersection Volume}}{\text{Union Volume}}$$

and 2D IoU is defined for the top view (also, referred to as bird-eye-view (BEV)) rectangles of 3D bounding boxes, as $$\frac{\text{Intersection Area}}{\text{Union Area}}.$$

Two equal-sized boxes with half overlap would have an IoU of 0.33. Hence, even an IoU of around 0.5 is generally regarded as a good overlap. mAP is the area under the precision-recall (PR) curve, which is a measure of the number of actual boxes detected (recall) along with the accuracy of detections (precision). Specifically, precision is obtained for incremental recall values to get PR curve:

Precision=TP/(TP+FP)

Recall=TP/(TP+FN)

mAP=Area(precision-recall curve)

An estimation is regarded as a true positive (TP) if it is above a particular IoU (Intersection Over Union) threshold. Note that a higher recall rate may be obtained by predicting a large number of boxes, but at the cost of sacrificing precision (e.g., more False Positives (FP)) and vice-versa. A higher mAP may mean better performance on both accuracy (precision) and exhaustiveness (recall) of estimation. An FP may also be obtained because of noise. An FP generated due to noise may have a very small (approximately 0) IoU with any ground truth box. Thus, in a lower IoU threshold regime, the mAP may be more sensitive to the amount of noise and may allow better comparison of noise suppression performance.

The current subject matter system achieved a median error of less than 37 cm in localizing the center of an object bounding box and a median error of less than 25 cm in estimating the dimensions of the bounding boxes. A 2D IoU (BEV IoU) was used as a threshold for the mAP metric. The current subject matter system achieved an mAP score of 0.67 for an IoU threshold of 0.5 and a score of 0.94 for a lower IoU threshold of 0.2, which is a 45% improvement over a single radar system.

Figure 8A:
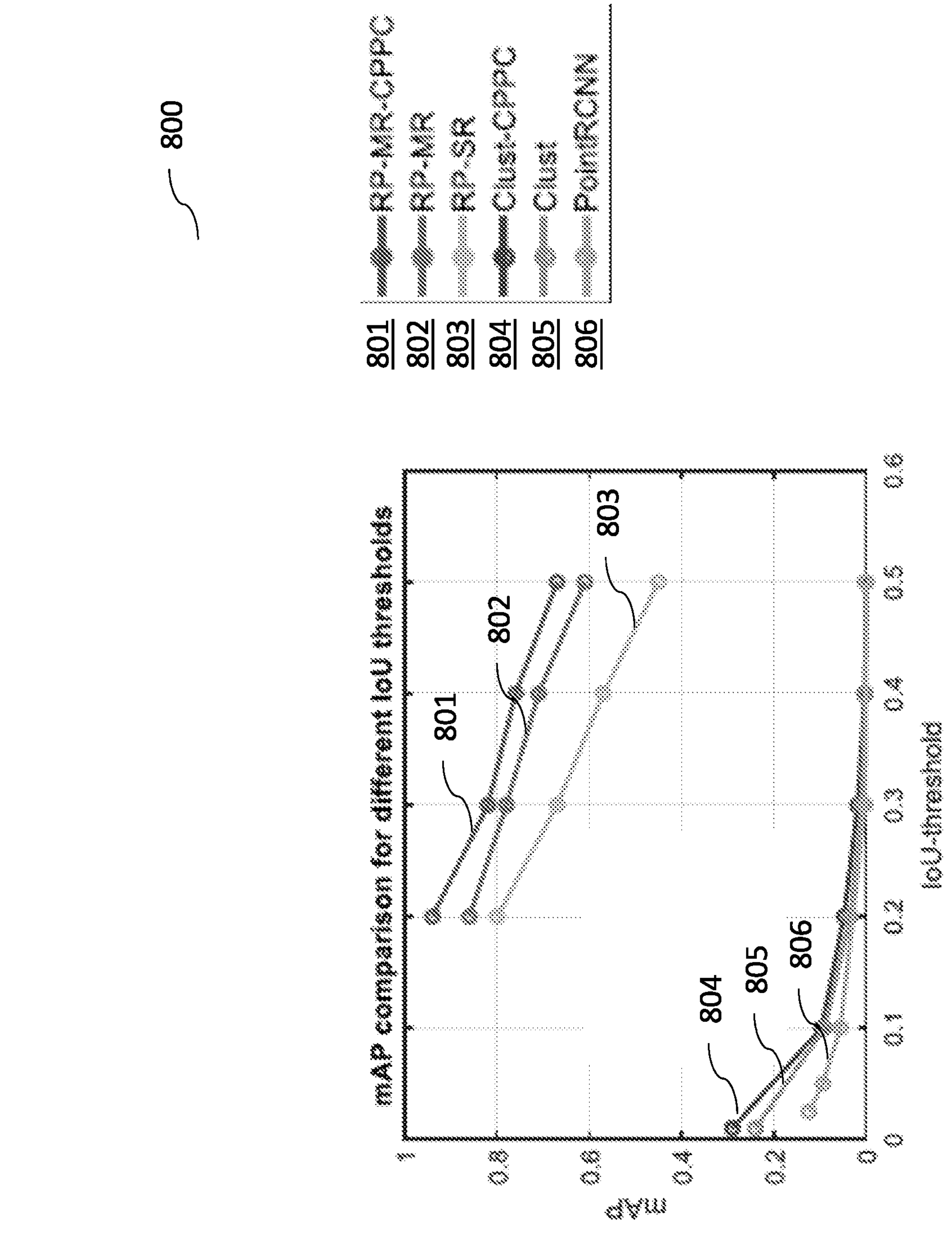
FIGS. 8*a-c* are plots illustrating exemplary experimental performances of various systems.
Figure 8B:
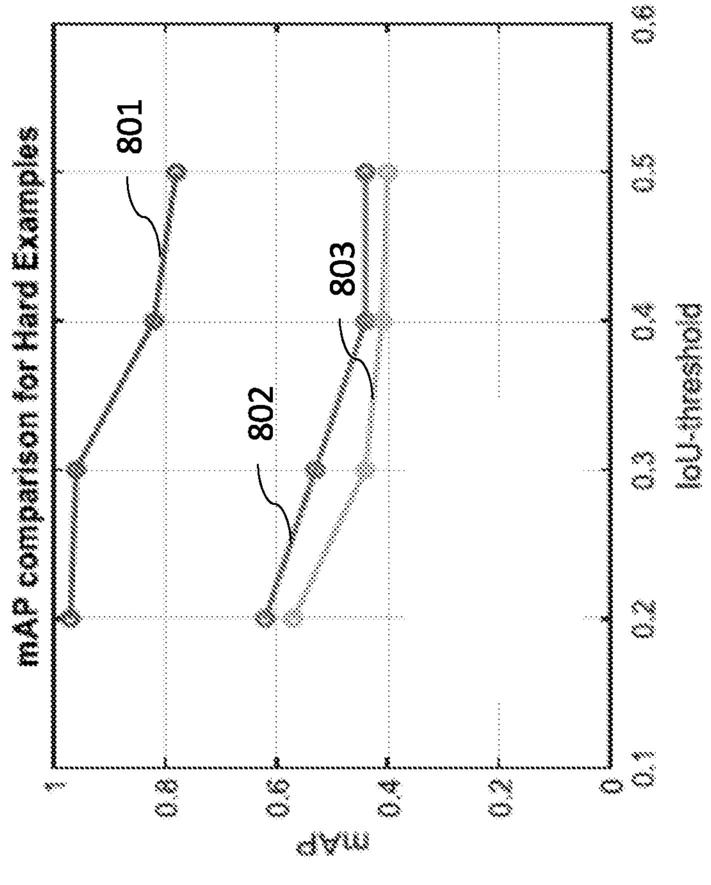
Figure 8C:
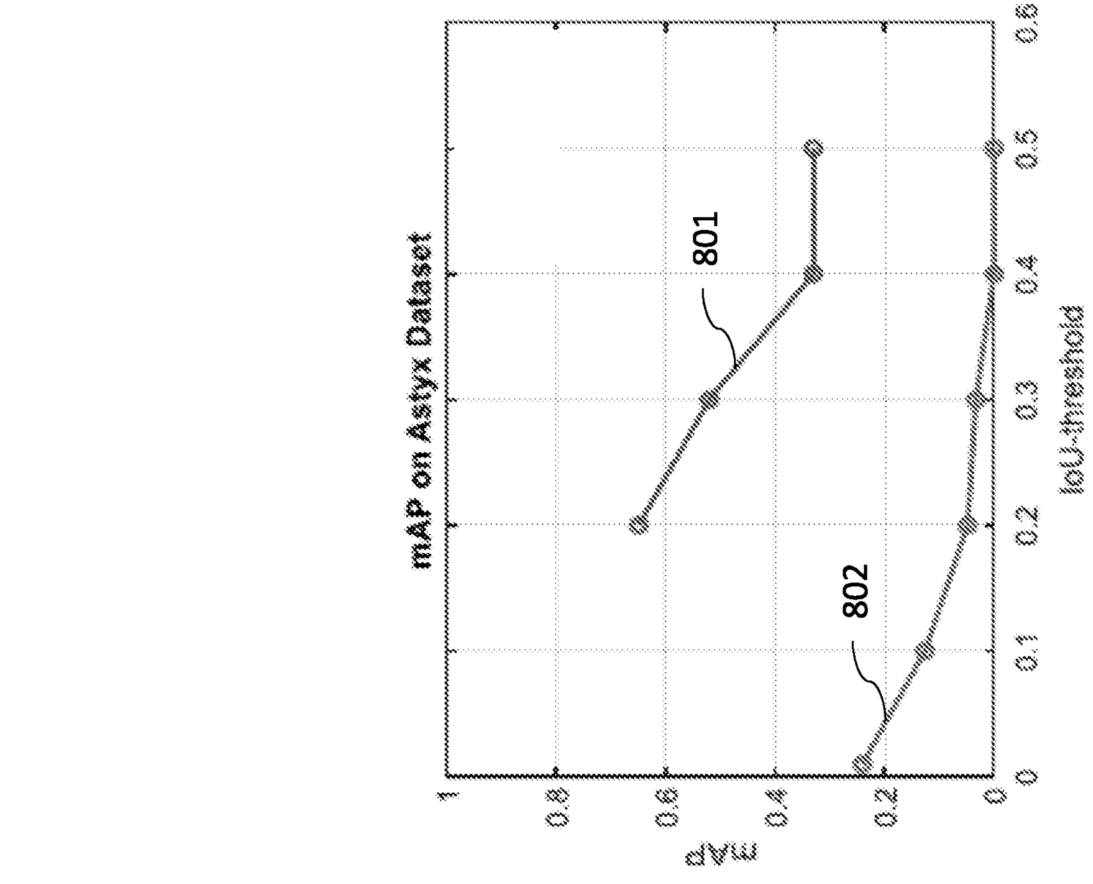

An experimental current subject matter system (referred to as RP-MR-CPPC 801 in FIGS. 8*a*-*c*) included multi-radar (MR) fusion to generate cross potential point clouds (CPPC) and RP-net to estimate 3D bounding box. FIGS. 8*a*-*c* are plots 800, 810, and 820, respectively, illustrating exemplary experimental performances of various systems, including the experimental current subject matter system. To individually compare the mAP performances, the following baselines were defined (as shown in FIGS. 8*a*-*c*):

- RP-MR 802: system with multiple radar data without cross potential point clouds fusion. The point clouds from multiple radars are simply added in the global coordinate system.
- RP-SR 803: system with single radar data.
- Clust-CPPC 804: system with clustering based approach used on cross potential point clouds.
- Clust 805: system with a clustering based bounding box estimation baseline. A predefined size bounding box is estimated for each cluster found using DBSCAN, coupled with angle estimation.
- PointRCNN 806: system implementing well-known LiDAR based 3D bounding box estimation network PointRCNN.

FIG. 8*a* is a plot 800 illustrating an overall performance of systems 801-806. The X-axis is the IoU thresholds used for the mAP values. Further, to best examine the performance improvement brought in by CPPC, performances of the system were evaluated using a subset of validation set that contains hard examples following KiTTi evaluation framework. Hard examples are characterized by point clouds containing more than one-fourth of the points coming from noise, and the vehicles are undertaking complex maneuvers (sharp turns). The results of hard examples are shown by the plot 810 in FIG. 8*b*. FIG. 8*c* shows plot 820 illustrating a mAP performance of the current subject matter system on another dataset compared to a clustering baseline 802.

Figure 10:
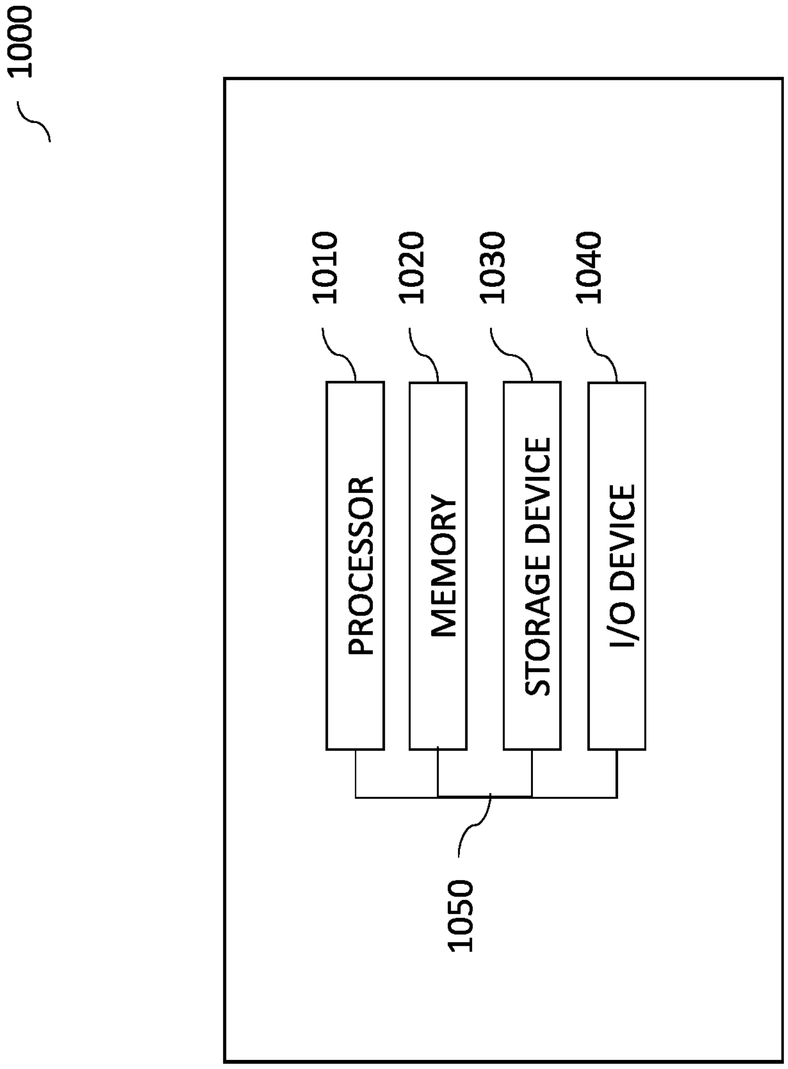
FIG. 10 illustrates an exemplary system, according to some implementations of the current subject matter.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
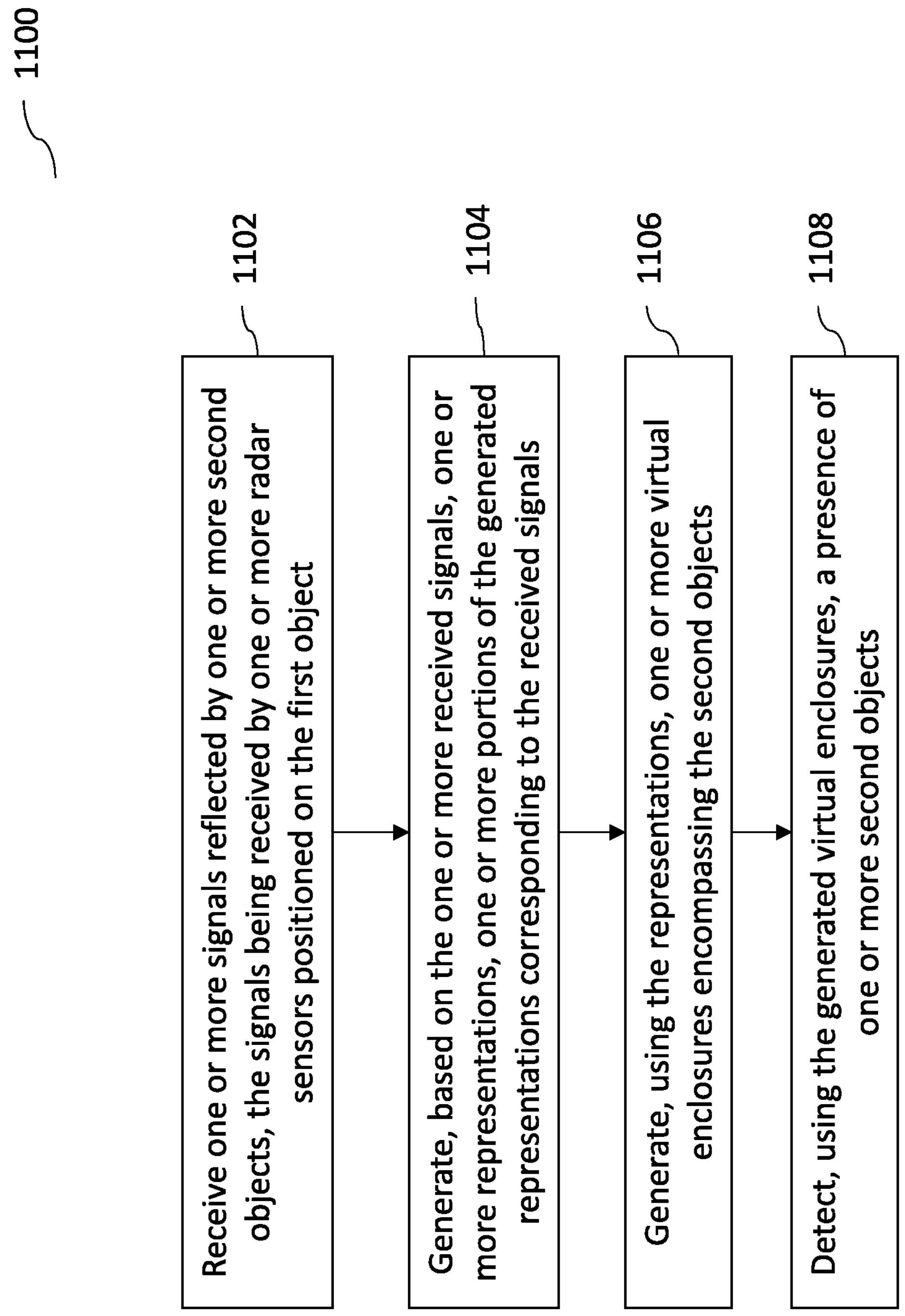
FIG. 11 illustrates an exemplary method, according to some implementations of the current subject matter.

FIG. 11 illustrates an exemplary process 1100 for identifying or detecting one or more objects in an environment of another object (e.g., autonomous vehicle, etc.), according to some implementations of the current subject matter. The process 1100 may be performed by the system 200 shown in FIG. 2 and using any of the methodologies discussed above in connection with FIGS. 2-9*d*.

At 1102, the system 200 may be configured to receive one or more signals reflected by one or more second objects (e.g., other vehicles, telephone poles, buildings, etc.). The second objects, for example may be located in an environment (e.g., a scene) of a first object (e.g., autonomous vehicle). The signals may be received by one or more radar sensors positioned on one or more first objects. For example, radar sensors 202 may be positioned on one or more first object (e.g., at a predetermined distance apart, such as, at a width of the vehicle). An exemplary sensor positioning is illustrated in FIG. 5*a*.

At 1104, the radar point cloud generator 204 may be configured to generate, based on the received signals, one or more representations (e.g., point clouds). The representations may include a plurality of portions (e.g., points) corresponding to the received signals. An exemplary representation (e.g., a point cloud) is shown in FIG. 5*b*.

At 1106, the system 200 may be configured to generate one or more virtual enclosure encompassing one or more second objects. Exemplary virtual enclosures (e.g., bounding boxes) are illustrated in FIG. 5*c*. Using the virtual enclosures a location of one or more second objects (e.g., in an environment of one or more first objects) may be detected, at 1108.

In some implementations, the current subject matter may include one or more of the following optional features. The radar sensors may be positioned on the vehicle a predetermined distance apart. The radar sensors may include two radar sensors.

In some implementations, the radar sensors may include a plurality of radar sensors. At least one radar sensor in the plurality of radar sensors may be configured to receive a signal transmitted by at least another radar sensor in the plurality of radar sensors (e.g., as shown in FIG. 9*d*). Further, at least a portion of the plurality of radar sensors may be time-synchronized.

In some implementations, one or more generated representations may include one or more point clouds. One or more portions of the generated representations may include one or more points in the point clouds. In some implementations, the method 1100 may also include filtering the generated point clouds to remove one or more points corresponding to one or more noise signals in the received signals, and generating, using the filtered point clouds, one or more virtual enclosures encompassing the second objects.

In some implementations, the generating of the point clouds may include generating one or more cross potential point clouds by combining one or more point clouds generated using signals received by each radar sensor. Generation of one or more cross potential point clouds may include clustering at least a portion of the point clouds using a number of points corresponding to at least a portion of the received signals being received from the same scattering region of a second object, generating one or more clustered point clouds, combining at least a portion of the clustered point clouds based on a determination that at least a portion of the clustered point clouds is associated with the second object and determined based on signals received from different radar sensors, and generating the cross potential point clouds.

In some implementations, the filtering may include removing one or more noise signals in the received signals received by each radar sensor. The filtering may include removing one or more noise signals in the received signals using one or more predetermined signal to noise ratio thresholds.

In some implementations, the generation of one or more object enclosures may include generating one or more anchor enclosures (e.g., anchor boxes) corresponding to each point in the point clouds. Generation of one or more anchor enclosures may include extracting, using the anchor enclosures, a plurality of features corresponding to the second objects, and determining, based on the extracting, a single feature representative of each anchor enclosure. Generation of one or more object enclosures may include predicting one or more object enclosures using the determined single feature of each anchor enclosure, associating a confidence value with each predicted object enclosure in the predicted object enclosures, and refining, based on the associated confidence value, one or more parameters of each predicted object enclosure to generate one or more virtual enclosures.

In some implementations, the object enclosure may include at least one of the following: a three-dimensional object enclosure, a two-dimensional object enclosure, and any combination thereof. The one or more virtual enclosures may include at least one of the following parameters: a length, a breadth, a height, one or more center coordinates, an orientation angle, and any combination thereof.

In some implementations, at least one of the first and second objects may include at least one of the following: a vehicle, an animate object, an inanimate object, a moving object, a motionless object, a human, a building, and any combination thereof.

In some implementations, the presence of an object may include at least one of the following: a location, an orientation, a direction, a position, a type, a size, an existence, and any combination thereof of the one or more second objects.

In some implementations, one or more second objects may be located in an environment of the one or more first objects. The presence of one or more second objects may be determined in the environment of the one or more first objects.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method, comprising:

receiving one or more signals reflected by one or more second objects, the signals being received by one or more radar sensors positioned on one or more first objects;

generating, based on the one or more received signals, one or more representations, one or more portions of the generated representations corresponding to the one or more received signals, wherein the one or more representations include one or more point clouds, wherein the one or more portions of the representations include one or more points in the one or more point clouds;

filtering the one or more point clouds to remove one or more points corresponding to one or more noise signals in the one or more received signals;

wherein the one or more point clouds comprise one or more cross potential point clouds generated by combining one or more point clouds generated using signals received by each radar sensor of the one or more radar sensors, wherein generation of the one or more cross potential point clouds further comprises:

clustering at least a portion of the one or more point clouds based on a number of points corresponding to at least a portion of the one or more received signals received from one or more scattering regions of a second object in the one or more second objects, and generating one or more clustered point clouds;

determining, based at least on a confidence metric, that a first cluster representative of the second object corresponds to a second cluster representative of the second object, wherein the first cluster is in a first clustered point cloud associated with a first radar sensor and the second cluster is in a second clustered point cloud associated with a second radar sensor, wherein the confidence metric is indicative of the first clustered point cloud and the second clustered point cloud corresponding to the second object;

combining, based on the determining, at least the first clustered point cloud and the second clustered point cloud to generate the one or more cross potential point clouds, wherein the confidence metric is included in the one or more cross potential point clouds;

generating, using the one or more cross potential point clouds, one or more virtual enclosures encompassing the one or more second objects; and detecting, using the generated one or more virtual enclosures, a presence of the one or more second objects.

2. The method according to claim 1, wherein the one or more radar sensors are positioned on the one or more first objects at a predetermined distance apart, and wherein the predetermined distance is between 1.5 meters and 2 meters.

3. The method according to claim 1, wherein the one or more radar sensors include two radar sensors.

4. The method according to claim 1, wherein the one or more radar sensors include a plurality of radar sensors.

5. The method according to claim 4, wherein at least one radar sensor in the plurality of radar sensors is configured to receive a signal transmitted by at least one of the following: another radar sensor in the plurality of radar sensors, the at least one radar sensor, and any combination thereof.

6. The method according to claim 4, wherein at least a portion of the plurality of radar sensors is time-synchronized.

7. The method according to claim 1, wherein the filtering includes removing one or more noise signals in the one more received signals received by each radar sensor in the one or more radar sensors.

8. The method according to claim 1, wherein the filtering includes removing one or more noise signals in the one or more received signals using one or more predetermined signal to noise ratio thresholds.

9. The method according to claim 1, wherein the generating one or more virtual enclosures includes generating one or more anchor enclosures corresponding to each point in the one or more point clouds.

10. The method according to claim 9, wherein the generating one or more anchor enclosures includes extracting, using the one or more anchor enclosures, a plurality of features corresponding to the one or more second objects; and determining, based on the extracting, a single feature representative of each anchor enclosure.

11. The method according to claim 10, wherein the generation of one or more virtual enclosures includes predicting the one or more second objects virtual enclosures using the determined single feature of each anchor enclosure;

associating a confidence value with each predicted virtual enclosure in the one or more predicted virtual enclosures; and refining, based on the associated confidence value, one or more parameters of each predicted virtual enclosure to generate one or more virtual enclosures.

12. The method according to claim 1, wherein the one or more virtual enclosures include at least one of the following: a three-dimensional virtual enclosure, a two-dimensional virtual enclosure, and any combination thereof.

13. The method according to claim 1, wherein the one or more virtual enclosures include at least one of the following parameters: a length, a breadth, a height, one or more center coordinates, an orientation angle, and any combination thereof.

14. The method according to claim 1, wherein at least one of the first and second objects include at least one of the following: a vehicle, an animate object, an inanimate object, a human, a building, a moving object, a motionless object, and any combination thereof.

15. The method according to claim 1, wherein the presence includes at least one of the following: a location, an orientation, a direction, a position, a type, a size, an existence, and any combination thereof of the one or more second objects, wherein the one or more second objects being located in an environment of the one or more first objects, wherein the presence of the one or more second objects is being determined in the environment of the one or more first objects.

16. A system comprising:

at least one programmable processor; and a non-transitory machine-readable medium storing instructions that, when executed by the at least one programmable processor, cause the at least one programmable processor to perform operations comprising:

receiving one or more signals reflected by one or more second objects, the signals being received by one or more radar sensors positioned on one or more first objects;

generating, based on the one or more received signals, one or more representations, one or more portions of the generated representations corresponding to the one or more received signals, wherein the one or more representations include one or more point clouds, wherein the one or more portions of the representations include one or more points in the one or more point clouds;

filtering the one or more point clouds to remove one or more points corresponding to one or more noise signals in the one or more received signals;

wherein the one or more point clouds comprise one or more cross potential point clouds generated by combining one or more point clouds generated using signals received by each radar sensor of the one or more radar sensors, wherein generation of the one or more cross potential point clouds further comprises:

clustering at least a portion of the one or more point clouds based on a number of points corresponding to at least a portion of the one or more received signals received from one or more scattering regions of a second object in the one or more second objects, and generating one or more clustered point clouds;

determining, based at least on a confidence metric, that a first cluster representative of the second object corresponds to a second cluster representative of the second object, wherein the first cluster is in a first clustered point cloud associated with a first radar sensor and the second cluster is in a second clustered point cloud associated with a second radar sensor, wherein the confidence metric is indicative of the first clustered point cloud and the second clustered point cloud corresponding to the second object;

combining, based on the determining, at least the first clustered point cloud and the second clustered point cloud to generate the one or more cross potential point clouds, wherein the confidence metric is included in the one or more cross potential point clouds;

generating, using the one or more cross potential point clouds, one or more virtual enclosures encompassing the one or more second objects; and detecting, using the generated one or more virtual enclosures, a presence of the one or more second objects.

* * * * *